US009220991B2

(12) United States Patent
Gastle et al.

(10) Patent No.: US 9,220,991 B2
(45) Date of Patent: Dec. 29, 2015

(54) CHILDREN'S RIDE-ON VEHICLES AND PLAY SYSTEMS INCORPORATING WHEEL AND TRACK ASSEMBLIES

(71) Applicant: Mattel, Inc., El Segundo, CA (US)

(72) Inventors: Kevin M. Gastle, Boston, NY (US); David E. Grober, East Aurora, NY (US); Kurt J. Huntsberger, Arcade, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 14/528,022

(22) Filed: Oct. 30, 2014

(65) Prior Publication Data

US 2015/0135981 A1   May 21, 2015

Related U.S. Application Data

(63) Continuation-in-part of application No. 14/273,768, filed on May 9, 2014.

(60) Provisional application No. 61/905,661, filed on Nov. 18, 2013.

(51) Int. Cl.
| | |
|---|---|
| *A63H 18/08* | (2006.01) |
| *A63H 17/26* | (2006.01) |
| *B61B 13/00* | (2006.01) |
| *B62K 9/00* | (2006.01) |

(52) U.S. Cl.
CPC ............... *A63H 18/08* (2013.01); *A63H 17/26* (2013.01); *B61B 13/00* (2013.01); *B62K 9/00* (2013.01)

(58) Field of Classification Search
CPC ....... A63H 18/00; A63H 18/02; A63H 17/00; A63H 17/02; A63H 23/00; A63H 23/02; A63H 19/30; A63H 18/08; A63H 17/26; B61B 13/00; B61F 9/00
See application file for complete search history.

(56) References Cited

U.S. PATENT DOCUMENTS

| | | | |
|---|---|---|---|
| 1,707,615 | A | 4/1929 | Hunt |
| 2,318,958 | A | 5/1943 | Murphy |
| 2,333,504 | A | 11/1943 | Alben |
| 2,787,970 | A | 4/1957 | Bennett |
| 2,882,089 | A | 4/1959 | Vaszin |

(Continued)

OTHER PUBLICATIONS

Fisher-Price Thomas & Friends Thomas the Tank Engine Owner's Manual with Assembly Instructions for Model T4963, pp. 1-20, 2010.

(Continued)

*Primary Examiner* — Jason C Smith
(74) *Attorney, Agent, or Firm* — Dascenzo Intellectual Property Law, P.C.

(57) ABSTRACT

Play systems of the present disclosure comprise a children's ride-on vehicle and a companion track. The companion vehicle and track each include a guide surface that is complementary to the companion apparatus and configured to guide the vehicle along a path of travel defined by the track. The children's ride-on vehicle may be powered, steerable, and configured to operate on and off the track. When the children's ride-on vehicle is guided and/or steered along the path of travel, the complementary guide surfaces do not substantially impede progress of the vehicle. When the children's ride-on vehicle is guided and/or steered away from the path of travel, the complementary guide surfaces contact and/or frictionally engage to direct the vehicle along the path of travel and/or to slow progress of the vehicle.

25 Claims, 7 Drawing Sheets

(56) References Cited

U.S. PATENT DOCUMENTS

| | | | |
|---|---|---|---|
| 3,218,757 A | | 11/1965 | Benkoe |
| 3,589,064 A | | 6/1971 | Harada |
| 3,592,384 A | * | 7/1971 | Tomaro ............... 238/200 |
| 3,684,173 A | | 8/1972 | Casadio |
| 4,212,250 A | | 7/1980 | Burgess |
| 4,260,104 A | | 4/1981 | Schaffan |
| 4,357,877 A | | 11/1982 | Mariol |
| 4,403,733 A | | 9/1983 | Bach et al. |
| 4,417,523 A | | 11/1983 | Mariol |
| 5,016,540 A | | 5/1991 | Barber |
| 5,232,154 A | | 8/1993 | Jenkins et al. |
| 5,440,996 A | * | 8/1995 | Cottino ............... 104/47 |
| 5,463,961 A | | 11/1995 | Graves |
| 5,644,114 A | | 7/1997 | Neaves |
| 5,935,012 A | | 8/1999 | Cohn et al. |
| 6,105,982 A | | 8/2000 | Howell et al. |
| 6,264,330 B1 | | 7/2001 | Walton et al. |
| 6,509,719 B2 | | 1/2003 | Crofut et al. |
| 6,554,087 B2 | | 4/2003 | Huntsberger et al. |
| 6,631,925 B1 | | 10/2003 | Lawson, Jr. |
| 6,755,265 B2 | * | 6/2004 | Huntsberger et al. ....... 180/65.1 |
| 6,771,034 B2 | | 8/2004 | Reile et al. |
| 7,216,878 B2 | | 5/2007 | Damon |
| 7,413,041 B2 | * | 8/2008 | Drosendahl et al. ......... 180/65.1 |
| 7,562,629 B2 | * | 7/2009 | Lohr et al. ............. 105/72 |
| 7,568,753 B2 | * | 8/2009 | Arendt et al. ............ 296/177 |
| 7,752,978 B2 | * | 7/2010 | Schroeder ............. 104/245 |
| 7,905,305 B2 | | 3/2011 | Lucas et al. |
| 7,939,008 B2 | | 5/2011 | Arendt et al. |
| 8,069,793 B2 | * | 12/2011 | Rice ................. 105/1.5 |
| 8,164,429 B2 | * | 4/2012 | Reynolds et al. .......... 340/425.5 |
| 8,382,005 B1 | * | 2/2013 | Fletcher ............... 238/10 F |
| 2005/0197042 A1 | | 9/2005 | Larsen |
| 2006/0230974 A1 | * | 10/2006 | Murray ............... 104/53 |
| 2010/0248586 A1 | * | 9/2010 | Cochella ............. 446/444 |
| 2010/0282120 A1 | * | 11/2010 | Micheletti ............. 104/106 |
| 2011/0048820 A1 | | 3/2011 | Harris |
| 2012/0171922 A1 | * | 7/2012 | Schlegel et al. .......... 446/168 |

OTHER PUBLICATIONS

Talking Train with Track—Kidz Motorz—Toys "R" Us (0236), pp. 1-8, downloaded from http://www.toysrus.com/buy/bikes-scooters-ride-ons/powered-riding-toys/powered-riding-toys/talking-train-with-track-0236-3370312, on or about May 10, 2013.

Amazon.com: New Star My Mini Express Train with Trailer—Red: Toys . . . , pp. 1-4, downloaded from http://www.amazon.com/New-Star-Express-Train-Trailer/dp/B001W7VAE0/ref=sr_1_10?s=toys-and-games&ie=UTF8&qid=1370904356&sr=1-10, on or about Jun. 10, 2013.

Peg Perego 2010 Catalog, cover and pp. 1, 2-3, and 10-11, downloaded from http://www.pegperegousa.com/admin/archive/downloads/ToysCatalofUsCa2010.pdf, on or about Jun. 6, 2013.

Peg Perego Choo Choo Express Train Manual (Model No. IGED 1116), pp. 1-24, circa 2006, downloaded from http://peg-peregoparts.com/manuals/IGED1116.pdf on or about Jun. 6, 2013.

Peg Perego Santa Fe Express Train Set Manual (Model No. IGED 1080), pp. 1-12, circa 2006, downloaded from http://peg-peregoparts.com/manuals/IGED1080.pdf on or about Jun. 6, 2013.

Peg Perego Santa Fe Train Set Manual (Model No. IGED 1084), pp. 1-12, circa 2006, downloaded from http://peg-peregoparts.com/manuals/IGED1084.pdf on or about Jun. 6, 2013.

Playskool Ride Around Train Instructions, pp. 1-2, circa 1992, downloaded from http://www.hasbro.com/common/instruct/RideAroundTrain.pdf, on or about Jun. 10, 2013.

ebay Playskool Ride on Train Battery Toddlers Brightly Colored Track Train Engine1991, pp. 1-6, downloaded from http://www.ebay.com/itm/Playskool-Ride-Train-Battery-Toddlers-Brightly-Colored-Track-Train-Engine1991-/390580227925#vi-content, on or about Jun. 10, 2013.

Talking Train User Manual, pp. 1-8, circa 2008, downloaded from http://www.funcreation.net/talkingtrain.html, on or about Jun. 6, 2013.

Thomas Track Rider Parts Diagram (Model No. 35168), Peg-PeregoParts.com, pp. 1-2, downloaded from http://peg-peregoparts.com/diagram.php?num=3516800 on or about Jun. 6, 2013.

* cited by examiner

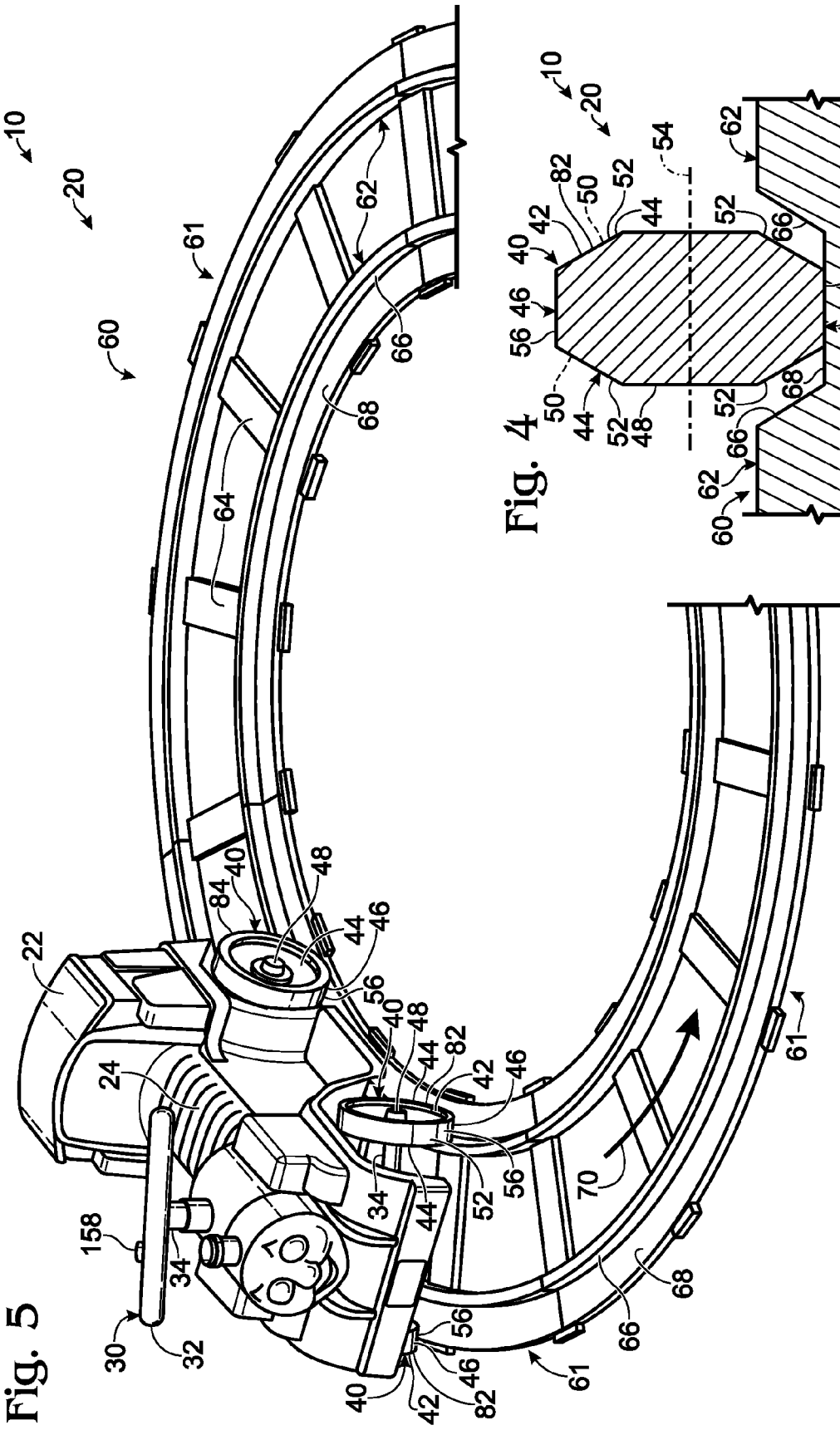

CHILDREN'S RIDE-ON VEHICLES AND PLAY SYSTEMS INCORPORATING WHEEL AND TRACK ASSEMBLIES

RELATED APPLICATIONS

This application claims priority under 35 U.S.C. §119(e) to U.S. Provisional Patent Application No. 61/905,661, which was filed Nov. 18, 2013 and the complete disclosure of which is incorporated herein by reference. This application also is a continuation-in-part of and claims priority under 35 U.S.C. §120 to U.S. patent application Ser. No. 14/273,768, which was filed on May 9, 2014 and the complete disclosure of which is incorporated herein by reference.

FIELD

The present disclosure relates to wheel and track assemblies for play systems incorporating children's ride-on vehicles, and to play systems that include such wheel and track assemblies.

BACKGROUND

Play systems come in many shapes and forms and include multiple components designed to be used together, for example a children's ride-on vehicle and a coordinating vehicle track. Children's ride-on vehicles are reduced-scale vehicles that are designed for use by children. For example, children's ride-on vehicles include a seat adapted to accommodate one or more children and steering and drive assemblies that are adapted to be operated by a child sitting on the seat. One type of drive assembly that is often used in children's ride-on vehicles includes a battery-powered motor assembly. When the motor assembly is energized, such as responsive to inputs from the child sitting on the seat, the powered, or driven, rotation of at least one of the children's ride-on vehicle's wheels results.

Play systems may include a track configured to define a path for a children's ride-on vehicle to ride along. Such a track may be utilized to define and/or limit the path of travel of a children's ride-on vehicle. For example, a play system may be utilized when the child driver of the ride-on vehicle is younger or otherwise less experienced operating the children's ride-on vehicle in an unrestricted manner and/or within an unrestricted area.

SUMMARY

Play systems of the present disclosure comprise a children's ride-on vehicle and a companion track that defines a path of travel for the children's ride-on vehicle. The children's ride-on vehicle and the track may be configured to cooperate with each other to inhibit, restrict, and/or prevent undesired separation of the children's ride-on vehicle from the track as the children's ride-on vehicle is operated on or in connection with the track. The children's ride-on vehicle and the track each have one or more guide surfaces that are complementary to the companion apparatus and which are configured to guide the children's ride-on vehicle along a path of travel defined by the track. The track may include a planar and/or undulating track support surface on which the rolling surfaces of the children's ride-on vehicle's wheels travel when the vehicle is operated on the track. In either configuration of track support surface, the guide surfaces of the track may be complementary to the guide surfaces of the children's ride-on vehicle when the vehicle moves along the path of travel defined by the track. The children's ride-on vehicle may be powered, steerable, and configured to operate on and off the track. When the children's ride-on vehicle is guided and/or steered along the path of travel, the complementary guide surfaces do not substantially impede progress of the children's ride-on vehicle along the path of travel. When the children's ride-on vehicle is guided and/or steered away from the path of travel, the complementary guide surfaces contact and/or frictionally engage to direct the children's ride-on vehicle along the path of travel and/or to slow progress of the children's ride-on vehicle.

BRIEF DESCRIPTION OF THE DRAWINGS

FIG. 4 is a cross-sectional view of wheel and track portions of examples of play systems according to the present disclosure.

FIG. 5 is a perspective view of a children's ride-on vehicle and a track of an example of a play system according to the present disclosure.

DESCRIPTION

Figure 1:
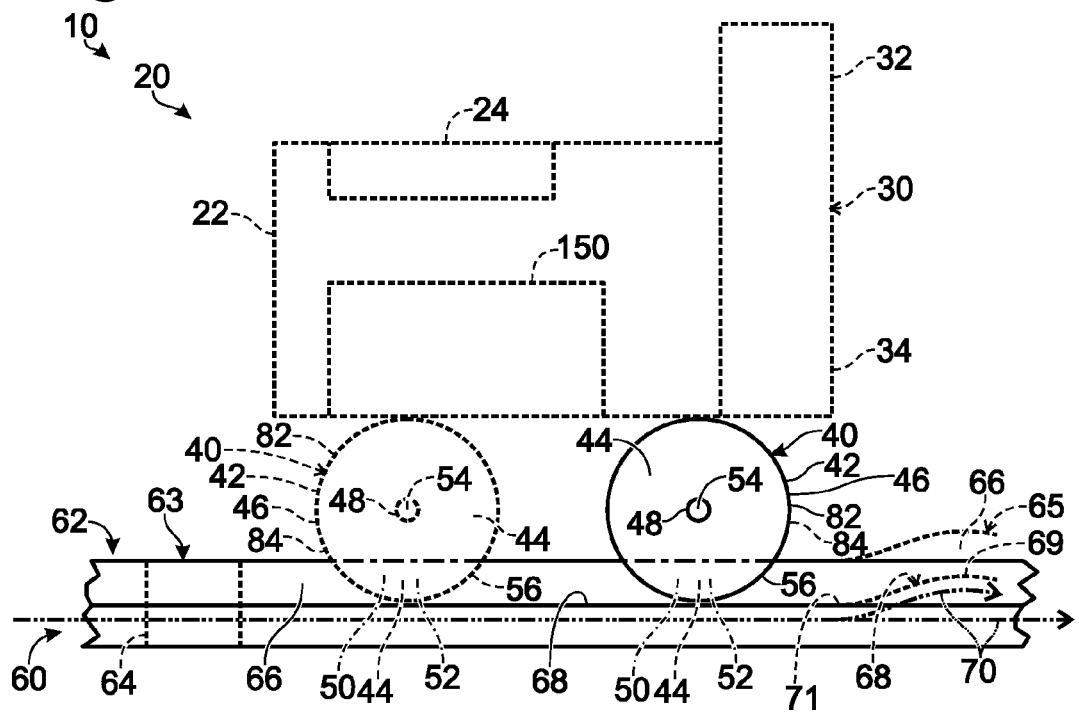
FIG. 1 is a fragmentary schematic representation of play systems according to the present disclosure.

FIGS. 1-14 illustrate play systems 10 and elements thereof according to the present disclosure. Elements that serve a similar, or at least substantially similar, purpose are labeled with numbers consistent among the figures. Like numbers in each of FIGS. 1-14, and the corresponding elements, may not be discussed in detail herein with reference to each of FIGS. 1-14. Similarly, all elements may not be labeled in each of FIGS. 1-14, but reference numerals associated therewith may be used for consistency. Elements, components, and/or features that are discussed with reference to one or more of FIGS. 1-14 may be included in and/or used with any of FIGS. 1-14 without departing from the scope of the present disclosure. In general, elements that are likely to be included are illustrated in solid lines, while elements that may be optional or alternatives are illustrated in dashed lines. However, elements that are shown in solid lines are not necessarily essential, and an element shown in solid lines may be omitted without departing from the scope of the present disclosure.

As schematically illustrated in FIG. 1, play systems 10 according to the present disclosure comprise a children's ride-on vehicle 20 and a track 60. The children's ride-on vehicle and the track of the play system are companion apparatuses that are configured to operate together for enhanced play value. However, the children's ride-on vehicle may be configured for on-track and off-track use and thus may be used independent of track 60. When used together to form a play system 10, the children's ride-on vehicle and the track cooperate with each other to inhibit, restrict and/or prevent separation of the children's ride-on vehicle from the track while the children's ride-on vehicle is operated by a child.

Children's ride-on vehicles 20 according to the present disclosure are reduced-scale vehicles configured for a child to ride and/or operate (e.g., drive). Children's ride-on vehicles generally are configured to mimic full-sized vehicles and comprise a reduced-scale vehicle body 22 sized for a child, a seat 24 sized for a child, and a plurality of wheels 40 operatively coupled to the vehicle body. When a child is sitting on seat 24 and conveying steering and/or other user inputs to the steering assembly and/or drive assembly of the children's ride-on vehicle, the child optionally may be referred to as a child operator. Children's ride-on vehicles are configured to travel by rolling on the plurality of wheels. The plurality of wheels is configured to support the weight of the children's ride-on vehicle, including the weight of a child seated upon the seat of the children's ride-on vehicle. Each wheel may support at least part of the children's ride-on vehicle.

Throughout this disclosure, general reference to top, bottom, front, back, left, right, forward, backward, inboard, and outboard are references to those directions with respect to the children's ride-on vehicle 20 in its normal, operational position (generally with the wheels 40 on the track, floor, ground, etc., and with the seat 24 above the bottom of the wheels). Left and right also refer to the left and right of a child operator while seated upon and operating the vehicle (facing forward). Inboard and outboard may additionally or alternatively be referred to as inner and outer, and/or as inwardly-facing and outwardly-facing, respectively. With respect to the track 60, the directions refer to a companion children's ride-on vehicle that is configured to operate on the track and to an operational position where the track is generally supporting the children's ride-on vehicle (e.g., the track generally is below the wheels).

Figure 2:
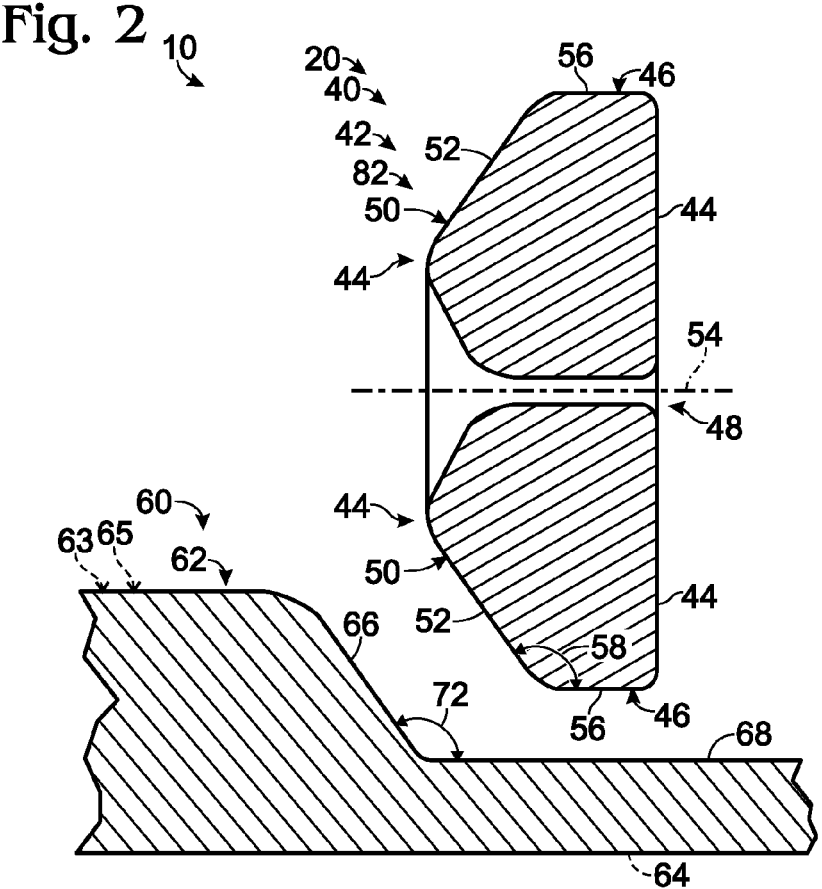
FIG. 2 is an exploded, cross-sectional view of wheel and track portions of examples of play systems according to the present disclosure.
Figure 3:
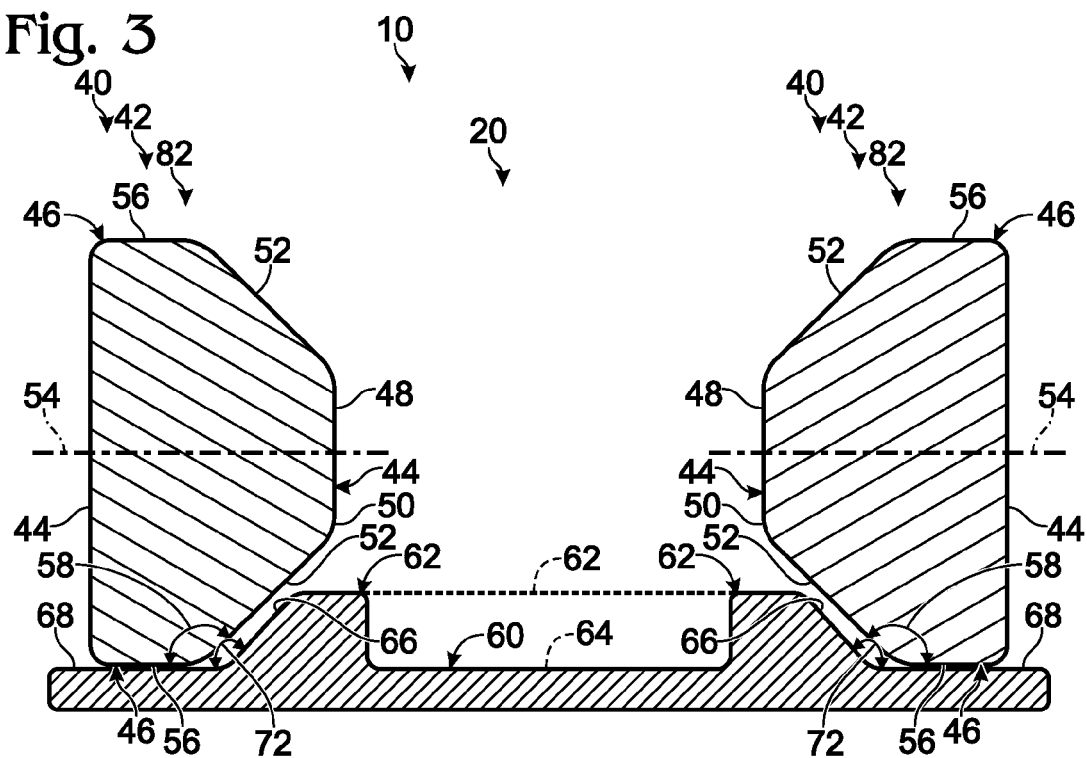
FIG. 3 is a cross-sectional view of wheel and track portions of examples of play systems according to the present disclosure.

As seen, for example, with reference to the general example of FIG. 1 and the more specific examples of FIGS. 2-4, each wheel 40 of the children's ride-on vehicle 20 includes a rim 46, two sidewalls 44 (e.g., an inboard sidewall and an outboard sidewall), and a hub 48. The rim is generally cylindrically shaped, with a generally circular profile, and is configured to support part of the weight of the children's ride-on vehicle, including the weight of a child seated upon the seat of the children's ride-on vehicle.

Each wheel 40 is configured to roll on the rim 46 (on a rolling surface 56) about a rolling axis 54 generally disposed through the geometric center of the rim and generally perpendicular to the generally circular profile of the rim. The rim is configured to roll along the track 60 and may be configured to roll along a surface of the track. The surface of the track, when present, may be referred to as a track support surface 68. The rolling surface 56 of the wheels may be adapted for on-track and off-track operation. For example, the rolling surface 56 may include and/or be defined by a tread surface, a traction band, a tire, etc. At least when used independent of track 60, rolling surface 56 additionally or alternatively may be referred to as a ground-contacting surface 56.

The hub 48 of the wheel 40 is disposed toward the center of the wheel, encompassing the rolling axis 54. The two sidewalls 44 each span a side of the wheel between the rim 46 and the hub 48, such as which is better seen in the examples of FIGS. 2-4. The sidewalls may be continuous and/or solid surfaces, but it also is within the scope of the present disclosure that the sidewalls may include one or more gaps, voids, channels, recesses, spokes, etc. In FIGS. 2-4, (and subsequently discussed FIGS. 11-14) only one or two wheels 40 of a children's ride-on vehicle 20 are shown, in an effort to simplify the figures and focus on the wheel-track features being discussed. However, the inclusion of reference numbers 10 and 20 in FIGS. 2-4 (and FIGS. 11-14) schematically represents that FIGS. 2-4 (and FIGS. 11-14) should be understood to include the remainder of a children's ride-on vehicle 20, and thus a play system 10 with the vehicle and track 60.

Children's ride-on vehicles 20 according to the present disclosure are steerable and include one or more wheels 40 which are steerable wheels 82. Steerable wheels are configured to change the direction of travel of the wheel, and thus vehicle 20, by pivoting about an axis oblique (generally perpendicular) to the rolling axis 54 of the wheel (e.g., pivoting about a generally vertical axis when the vehicle is in an operational position). At least one of the steerable wheels 82 of children's ride-on vehicles 20 according to the present disclosure is a guide wheel 42, as discussed further herein. All steerable wheels 82 may be guide wheels, and all guide wheels 42 may be steerable wheels, although this is not required to all embodiments. Children's ride-on vehicles 20 may comprise a steering assembly 30 coupled to one or more steerable wheels. The steering assembly is configured to translate steering inputs from a child operator of the children's ride-on vehicle into directional changes of the one or more steerable wheels (e.g., by changing the direction of travel). Thus, the steering inputs are able to redirect the children's ride-on vehicle and provide steering control to the child operator.

Tracks 60 according to the present disclosure are, and/or define, pathways configured for use by a children's ride-on vehicle 20. In particular, tracks 60 are reduced-scale, appropriately sized for a children's ride-on vehicle 20, and may be designed to mimic full-sized pathways such as automobile highways and/or railroads. As indicated in FIG. 1, tracks 60 define a path of travel 70 and comprise at least one rail 62, and optionally two rails 62, which is/are generally configured to guide the children's ride-on vehicle along the path of travel. The track 60 may comprise a track support surface 68 configured to support the children's ride-on vehicle, including a child seated upon the children's ride-on vehicle's seat when the vehicle is operated (i.e., driven) by the child on the track support surface. In other words, the track support surface, when present, is configured to support the weight of the children's ride-on vehicle and the weight of a child seated upon the children's ride-on vehicle during operative use of the children's ride-on vehicle on the track.

As indicated in solid lines in FIG. 1, track support surface 68, when present, may be and/or define a planar surface that defines a correspondingly planar path of travel 70. By this it is meant that the elevation, or vertical component, of the path of travel does not (appreciably) change when the track is situated on a level horizontal surface. Thus, the horizontal component of the path of travel may change, such as responsive to curvature of the track, but the support surface remains planar and defines a smooth, level surface. Thus, the front and rear wheels of the children's ride-on vehicle will be at the same elevation when the track support surface defines a planar path of travel and the track is on a level horizontal surface.

As indicated somewhat schematically in dashed lines on the right side of FIG. 1, it additionally or alternatively is within the scope of the present disclosure that at least a portion of track 60, and more particularly the track support surface 68 thereof, defines an undulating path of travel for children's ride-on vehicle 20 when the vehicle is operated on, or in connection with, the track. By this it is meant that the elevation, or vertical component, of the path of travel does not remain constant when the track is situated on a level horizontal surface. Instead, the elevation of the path of travel sequentially increases and decreases to define corresponding up and down, or uphill and downhill, regions. Such an undulating path of travel thus will enable the child to drive the ride-on vehicle on "off road," "hilly," and/or "bumpy" paths that mimic driving over bumps and/or up and down hills. The track support surface 68 that defines an undulating path of travel may be described as defining alternating peaks and/or maximum elevations 69 and corresponding valleys and/or minimum elevations 71. The minimum elevations 71 may correspond to the elevation of the planar regions of the track support surface when track 60 includes both planar and undulating track support surface regions. A track 60 within the scope of the present disclosure may define only planar track support surface regions, only undulating track support surface regions, or a combination of planar and undulating track support surface regions.

The track support surface 68, and the track 60 generally, is/are configured to permit the children's ride-on vehicle 20 to roll along the track support surface. The rail 62 generally protrudes above the track support surface when the track is in an operational position. The rail 62 and the track support surface 68 generally are adjacent, rigidly coupled, and together define the path of travel. Additionally or alternatively, the rail and/or the track support surface may be affixed to a rigid support (such as staked, pinned, or otherwise secured to a ground surface). At least where the rail is affixed to a rigid support, the track may not utilize and/or include a track support surface to define a stable path of travel. Where a track support surface is not included, the children's ride-on vehicle may roll on the surface (e.g., the floor, ground) adjacent to the rail. Additional examples of tracks are disclosed in U.S. Provisional Patent Application No. 61/905,665 and U.S. patent application Ser. No. 14/272,740, each entitled "Track Assemblies and Track Assembly Kits for Children's Ride-On Vehicles," the disclosures of which are hereby incorporated by reference.

Children's ride-on vehicles 20 and tracks 60 according to the present disclosure each include a guide surface that are complementary to the other. The children's ride-on vehicle 20 includes one or more wheel guide surfaces 52 that are on one or more wheels 40, which optionally may be steerable wheels 82, as discussed herein. The track 60 includes one or more track guide surfaces 66 that are on one or more rails 62. Play systems 10 are configured such that the wheel guide surface and the track guide surface may be selectively engaged (e.g., by steering the children's ride-on vehicle). When engaged, the wheel guide surface and the track guide surface form a frictional engagement that slows the progress of the children's ride-on vehicle along the path of travel 70 and/or guides (e.g., redirects) the children's ride-on vehicle toward/ along the path of travel. For example, when the wheel guide surface is held forcibly in contact with the track guide surface (e.g., the children's ride-on vehicle is steered away from, or contrary to, the path of travel), the frictional engagement generally adds resistance to the progress of the children's ride-on vehicle and slows the children's ride-on vehicle. As another example, when the wheel guide surface bumps, or incidentally contacts, the track guide surface, the frictional engagement and/or complementary shape generally aligns the wheel, including the wheel guide surface, with the rail, including the track guide surface.

When the wheel guide surface 52 and the track guide surface 66 come into contact, the complementary shapes generally result in frictional contact, and/or engagement, and tend to align, direct, and/or redirect the wheel 40 along the path of travel 70, generally substantially parallel to the track guide surface. The wheel guide surface and the track guide surface may be configured to resist engagement, tending to maintain a separation between the two surfaces except when a force is applied to the wheel (and/or the rail) to cause contact between the surfaces. For example, contact between the wheel guide surface and the track guide surface may not be a stable equilibrium position. When the wheel guide surface and the track guide surface come into contact, the complementary shapes may urge, direct, and/or redirect the wheel away from the track guide surface. Hence, the configuration of the wheel guide surface and the track guide surface may enable the children's ride-on vehicle to progress along the path of travel without significant frictional engagement of the guide surfaces if the children's ride-on vehicle is steered, actively or passively, along, or consistent with, the path of travel. If the children's ride-on vehicle is steered, actively or passively, away from the path of travel, and consequently into the track guide surface, the contact and/or engagement will (re)direct the children's ride-on vehicle along the path of travel instead of the direction of steering.

FIG. 2 depicts an exploded, cross-sectional view highlighting the interface between a children's ride-on vehicle 20 and a track 60, including the wheel guide surface 52 and the track guide surface 66. The illustrated wheel 40 of FIG. 2 provides an example of a wheel that is both a steerable wheel 82 and a guide wheel 42. A guide wheel is configured to guide the children's ride-on vehicle along the path of travel 70 defined by the track (in FIG. 2, the path of travel would be generally perpendicular to the page). At least one sidewall 44 of the guide wheel is a guide sidewall 50 that includes the wheel guide surface 52. The guide sidewall, and hence the wheel guide surface 52, may be on the inboard or the outboard side of the guide wheel. In FIG. 2, the guide wheel is shown including a single guide sidewall 44, but it is within the scope of the disclosure that a guide wheel 42 may include more than one guide sidewall (such as a pair of guide sidewalls that optionally may have opposed and/or mirror-image configurations). The wheel guide surface may span a portion of the guide sidewall and may be a contiguous or broken surface. For example, the wheel guide surface may be an annular segment of the guide sidewall. As another example, one guide sidewall may include several wheel guide surfaces, potentially arranged in a regular pattern such as in spaced-apart, annular and/or radial segments. The guide sidewall, and hence the guide wheel, may include exactly one wheel guide surface.

As shown in FIG. 2, the guide sidewall 50 of the guide wheel 42 generally forms a bulge that protrudes from the generally cylindrical form of the rim 46. The bulge of the guide sidewall additionally or alternatively may be referred to as a flared region, a projecting region, an inclined region, and/or a guide-engaging region. Where the guide sidewall is on the inboard side of the guide wheel, the bulge generally extends toward the inboard (central) portion of the children's ride-on vehicle 20. Where the guide sidewall is on the outboard side of the guide wheel, the bulge generally extends toward the outboard direction (away from the center of the children's ride-on vehicle).

The wheel guide surface 52 of a guide wheel 42 according to the present disclosure is generally an integral portion of the bulge. The maximum width of the guide wheel at the wheel guide surface 52 is generally wider than the width of the rim and/or the rolling surface 56 of the rim, and the bulge and/or wheel guide surface may have any suitable shape, or form, to provide the cooperative, selective engagement with a companion track, as discussed herein. For example, the bulge, and optionally the wheel guide surface, may be convex, or include a convex portion. As another example, the wheel guide surface may have a tapered and/or a substantially frustoconical form, and the guide sidewall 50 may have a tapered and/or a substantially frustoconical form owing to the projecting wheel guide surface. Where the wheel guide surface and/or the guide sidewall has, or includes, a frustoconical form, the symmetry axis of the frusto-cone is substantially the same as the rolling axis 54 of the guide wheel. The wheel guide surface generally is at an incline (relative to vertical) when the guide wheel is in an operable position. The wheel guide surface is generally oblique, not essentially perpendicular, to the rolling surface of the rim and/or the rolling axis 54 of the guide wheel. The interior angle 58 between the wheel guide surface and the rolling surface is generally an obtuse angle. In profile (as depicted in FIG. 2), the wheel guide surface, and/or a portion thereof, may be curved and/or straight. Where the wheel guide surface is generally annular, the profile may have an upper portion and a lower portion (as also depicted in FIG. 2), corresponding to opposite sides of the annulus (i.e., the profile of the annulus on opposite sides of the rolling axis). The wheel guide surface may be symmetric about the rolling axis of the guide wheel and may present a constant profile as the guide wheel rolls. Additionally or alternatively, the wheel guide surface may be asymmetric or include asymmetric portions.

As discussed, a play system 10 according to the present disclosure includes a track guide surface 66 that is complementary to a wheel guide surface 52. Examples of these complementary surfaces are generally indicated in the schematic view of FIG. 1, and in the more detailed examples of FIGS. 2-4. Generally, the two complementary surfaces face each other and have substantially the same profile. Where the wheel guide surface is asymmetric, the track guide surface may be complementary to one or more orientations of the wheel guide surface and/or the average profile of the wheel guide surface. Generally, the two complementary surfaces are configured to frictionally engage with an extended contact, e.g., a line contact, rather than a single point contact common for rigid convex objects. The extended contact may be a contiguous contact or may be a series of contact points and/or contact regions. The extended contact generally extends radially along the guide wheel, i.e., extending toward the rim 46 and toward the hub 48 along the wheel guide surface.

As illustrated in the examples of FIGS. 2-4, the rail 62 of the track 60 generally has a sloped, or inclined, side which includes the track guide surface 66, i.e., the top of the rail is generally the narrowest portion of the rail. Hence, the track guide surface 66 may be sloped, or inclined, when the track is in an operational position. For example, from the base of the rail toward the top of the rail, an outboard track guide surface (facing outboard, on the outboard side of the rail) may be inclined inboard (i.e., toward an inboard portion of the rail), and an inboard track guide surface (facing inboard, on the inboard side of the rail) may be inclined outboard (i.e., toward an outboard portion of the rail). The track guide surface may be, or may include a portion that is convex, concave, and/or flat. In profile generally perpendicular to the path of travel (as depicted in FIG. 2), the track guide surface, and/or a portion thereof, may be curved and/or straight, e.g., including a curved segment and/or a straight segment. The profile of the track guide surface generally has the same sloped, or inclined, features as the corresponding surface, e.g., generally inclined toward a narrower top of the rail.

As indicated in at least FIGS. 1-4, track 60 may include a track support surface 68. Where the track includes a track support surface 68, the track guide surface is generally adjacent and/or associated with one or more track support surfaces. When the track is in an operational position, the track guide surface is generally above, i.e., more elevated than, the (adjacent and/or associated) track support surface, and hence, the track support surface is generally below, i.e., less elevated than the (adjacent and/or associated) track guide surface.

Relative to the guide wheel 42, the track guide surface 66 is generally oblique, not essentially perpendicular to, the rolling surface 56 of the rim 46 of the wheel. Relative to the track support surface 68, the track guide surface is generally oblique, not essentially perpendicular, to the track support surface. The exterior angle 72 between the track guide surface and the (adjacent and/or associated) track support surface is generally an obtuse angle, such as is illustrated in FIG. 2. The exterior angle 72 may be substantially the same as the interior angle 58 between the wheel guide surface and the rolling surface of the guide wheel.

The rail 62 of a track 60 according to the present disclosure may include one or more track guide surfaces 66 on one or more sides of the rail. For example, a rail may include a track guide surface on the inboard and/or the outboard side of the rail. The rail may include exactly one track guide surface and/or may include one or more track guide surfaces on only one side of the rail. The track guide surface may be a contiguous or broken surface. The rail may include several track guide surfaces arranged in a regular pattern such as segments spaced apart along the rail, along the path of travel.

As illustrated in FIG. 3, play systems 10 may include a children's ride-on vehicle 20 with at least two wheel guide surfaces 52 that are complementary to at least two track guide surfaces 66 of a track 60. FIG. 3 depicts an example where two guide wheels 42 interact with one or two rails 62. Each complementary pair of guide surfaces (i.e., a wheel guide surface and a track guide surface) independently may be configured to selectively, frictionally engage when the children's ride-on vehicle is steered away from, or contrary to, the path of travel.

Generally, when play systems 10 include more than one pair of complementary guide surfaces, the different pairs of guide surfaces may be configured to guide the children's ride-on vehicle in different directions and/or at different times. For example, one pair of guide surfaces may be configured to engage when the children's ride-on vehicle is steered to the left of the path of travel while another pair of guide surfaces may be configured to engage when the children's ride-on vehicle is steered to the right of the path of travel. As further examples, a pair of guide wheels (e.g., a first and a second guide wheel) each may have a wheel guide surface on the inboard side of the wheel, and a pair of complementary track guide surfaces may be on the outboard side of one or more rails. Similarly, a play system may include a pair of guide wheels that each has a wheel guide surface on the outboard side of the wheel and a pair of complementary track guide surfaces on the inboard side of one or more rails.

Where the play system 10 includes a pair of guide wheels 42, the guide wheels are generally spaced apart, such as in the illustrative example of FIG. 3. The guide wheels may be disposed on opposite sides of the children's ride-on vehicle 20, for example, on the left side (disposed toward the left side) and on the right side (disposed toward the right side). Additionally or alternatively, when a pair of guide wheels 42 are utilized, the guide wheels may be aligned with a common rolling axis 54, or have rolling axes that are approximately co-linear. Further, guide wheels may be arranged fore and aft of each other, and/or inboard and outboard of each other.

Where the play system 10 includes a pair of rails 62, the rails are generally spaced apart in a substantially parallel relationship. The rails may be disposed on opposite sides of the track 60, for example, on opposite sides of the path of travel 70 (e.g., to the left and to the right of the center of the path of travel). FIG. 3 provides an illustrative example of a play system 10 with a pair of spaced-apart rails 62. In FIG. 3, the path of travel, as defined by the rails, may be described as being into or out of the page. Where the rails are disposed on opposite sides of the track, the spacing between the rails may be referred to as the gauge of the rails and/or track. Additionally or alternatively, rails may be aligned (generally in a substantially parallel relationship) on one side of the track. Track 60 may be configured to dispose the rails at a substantially constant spacing (a substantially constant gauge) or may be configured to vary the spacing of the rails along the path of travel. For example, the track may define curved and straight portions of the path of travel, and the rail spacing may be different in the straight and curved portions (e.g., narrower in the straight portion or vice versa). As used herein, a substantially parallel relationship of rails includes substantially parallel straight rails, substantially parallel curved rails, a defined distance between rails, a substantially constant spacing and/or gauge, and rails in which the spacing and/or gauge varies smoothly along the length of the rails.

As disclosed in more detail herein, where the play system 10 includes a pair of guide wheels 42 and a pair of rails 62, the spacing between the guide wheels 42, measured perpendicular to the path of travel 70, may be wider, narrower, and/or the same as the spacing between the rails at a particular point along the path of travel. Additionally or alternatively, the spacing between the wheel guide surface of each of the pair of guide wheels, measured perpendicular to the path of travel, may be wider, narrower, and/or the same as the spacing between the track guide surface of each of the pair of rails. The spacing of the guide wheels is configured to allow the children's ride-on vehicle to progress along the path of travel without substantial frictional engagement of the guide surfaces.

A play system 10 may include a children's ride-on vehicle 20 with a guide wheel 42 including two wheel guide surfaces 52 facing opposite directions and a track 60 with two rails 62 each including a track guide surface 66 facing opposite each other. Similarly, a play system 10 may include a track with a rail including two track guide surfaces facing opposite directions and a children's ride-on vehicle with two guide wheels each including a wheel guide surface facing opposite each other.

FIG. 4 depicts one such example where one guide wheel 42 has a wheel guide surface 52 on each of the sidewalls 44 (hence both are guide sidewalls 50). The guide wheel is configured to roll between the two rails 62 of the track 60, with each rail including a track guide surface that faces one of the wheel guide surfaces. The guide wheel is configured to roll between the rails (without substantial frictional engagement of any of the guide surfaces) unless, or until, the guide wheel is steered away from the path of travel (generally perpendicular to the plane of FIG. 4).

Children's ride-on vehicles 20 may include a single guide wheel 42 such as the guide wheel 42 illustrated in FIG. 4. The guide wheel may be substantially centered under the midline of the children's ride-on vehicle. Additionally or alternatively, the guide wheel may be on the left side or the right side of the children's ride-on vehicle with other wheels 40 to the right or left, respectively, of the guide wheel.

Figure 6:
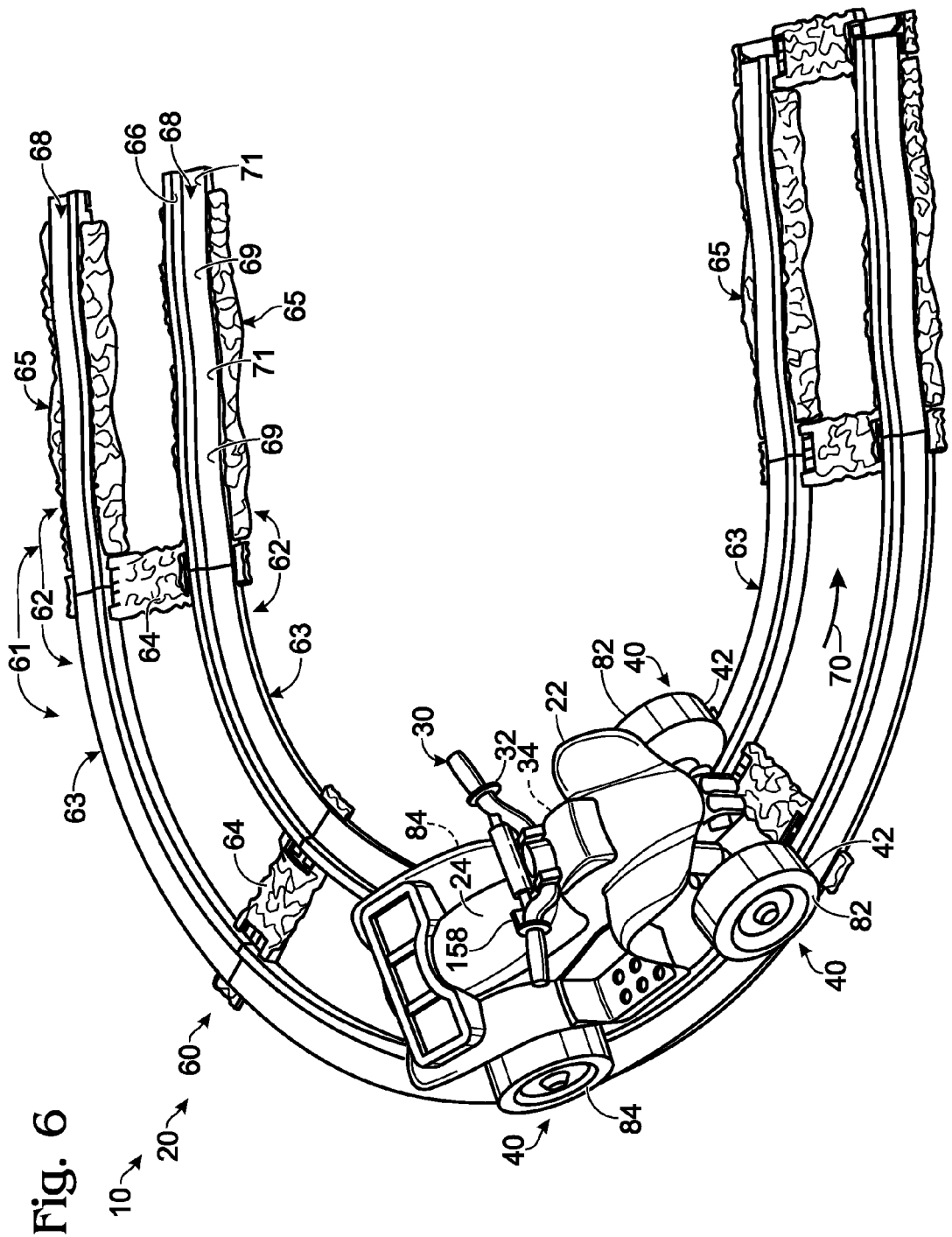
FIG. 6 is a perspective view of a children's ride-on vehicle and a track of an example of a play system according to the present disclosure.

FIGS. 5 and 6 depict an overview of examples of play systems 10, children's ride-on vehicles 20, and tracks 60 according to the present disclosure.

Children's ride-on vehicles 20 may be shaped to generally resemble any type of vehicle, including reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like, as well as vehicles that are shaped to resemble fantasy vehicles that do not have a corresponding adult-sized counterpart. Although children's ride-on vehicle 20 is depicted in FIG. 5 in the form of a four-wheeled train locomotive and in FIG. 6 in the form of a "quad" or all terrain vehicle (ATV), the components and/or features of a children's ride-on vehicle 20 may be configured for use on and/or with any type, style, and/or shape of children's ride-on vehicle.

While children's ride-on vehicles 20 are generally depicted including four wheels, including two steerable wheels 82, any suitable number of wheels may be included as part of a children's ride-on vehicle according to the present disclosure, including two, three, four, or more than four wheels.

Vehicle body 22, wheel(s) 40, track 60, and/or rail(s) 62 typically are formed (at least substantially, if not completely) from molded plastic and may be integrally formed or formed from a plurality of parts that are secured together by screws, bolts, clips, or other suitable fasteners. The components may additionally or alternatively be formed at least partially from other suitable material(s), such as metal, wood, or composite materials. The components may include an underlying frame, or chassis. In such an embodiment, the components may be formed of metal and/or molded plastic, with the frame formed of metal and/or plastic.

Examples of children's ride-on vehicles 20 that may include one or more guide wheels 42 and which optionally may be used with a track 60 to form a play system 10 are disclosed in U.S. Pat. Nos. 5,644,114, 6,105,982, 6,509,719, 6,554,087, 6,755,265, 6,771,034, 7,216,878, 7,413,041, 7,568,753, 7,905,305, 7,939,008, and 8,164,429, the disclosures of which are hereby incorporated by reference.

FIG. 5 also depicts an example of a suitable layout, or assembled configuration, for a track 60, which defines a path of travel 70 for the children's ride-on vehicle when the vehicle is used with the track. As depicted, the track is approximately circular, and the path of travel is a corresponding (approximately) circular path that extends around the track. As used herein, tracks 60 that define circular, oval, or otherwise continuous loops or circuits may be described as defining a continuous path of travel. As also depicted, track 60 includes two spaced-apart track support surfaces 68 that define a planar path of travel. Thus, as the children's ride-on vehicle is driven on track support surface 68, the vehicle's wheels 40 will remain on the same plane as the vehicle travels around the track along the path of travel.

Tracks 60 are elongated and generally may be configured to form a circuit (e.g., a continuous loop or an open circuit). In FIGS. 5 and 6, track 60 is depicted as including a plurality of interconnected curved track sections 61. It is within the scope of the present disclosure that track 60 may have a different number of track sections (optionally, only a single continuous section), and/or that the track sections may have different shapes, sizes, and/or orientations. For example, some tracks 60 may include straight portions (configured to guide a children's ride-on vehicle straight), curved portions (configured to guide a children's ride-on vehicle around a curve), crossover portions, branches, and/or switches. For example, the track may define an oval path of travel, a figure eight path of travel, and/or a branching network of travel paths. Tracks 60 may include cross ties, or cross members, 64 configured to span between the rails 62 and couple the rails together. The cross ties are configured to maintain the local spacing between the rails (i.e., the rails are generally rigidly coupled). Tracks 60 may include, and/or may be composed of, a plurality of track sections 61 that are configured to be assembled and disassembled. The track sections may include one or more rails and/or one or more cross ties. When a track includes a plurality of track sections, one track section may be straight (including a straight portion) and another track section may be curved (including a curved portion). Track sections may be configured to interconnect to form one or more substantially continuous rail(s) and/or a substantially continuous track (whether the track path be a loop or an open circuit).

FIG. 6 depicts an example of a suitable layout, or assembled configuration, for a track 60. In FIG. 6, track 60 defines an oval path of travel 70. FIG. 6 also provides an example of a track that defines an undulating path of travel in which the track includes track support surfaces 68 having a vertical component, or elevation, that sequentially transitions, oscillates, or otherwise changes between maximum (peak) 69 and minimum (valley) 71 regions. In FIG. 6, track 60 includes both planar and undulating regions. As depicted, the track includes a plurality of interconnected track sections 61, with some of the track sections being planar track sections 63 that define planar paths of travel and some of the track sections being undulating, or uneven, track sections 65 that define undulating paths of travel. It is within the scope of the present disclosure that a track section 61 may include at least one region that defines a planar path of travel and at least one region that defines an undulating path of travel.

As also depicted in FIG. 6, even though the elevation, or vertical component of the path of travel 70 defined by the track (such as by the track support surfaces 68 thereof) may vary, the track may define a continuous track guide surface 66 that defines the horizontal component of the path of travel. Thus, even if a children's ride-on vehicle 20 that is traveling along the path of travel travels along level, uphill, and downhill regions of the track, the track guide surface 66 still defines the horizontal, or steering, component of the path of travel. As discussed, the track guide surface 66 guides the ride-on vehicle to remain along this path of travel even if the child imparts steering inputs that steer the vehicle out of the path of travel.

Figure 7:
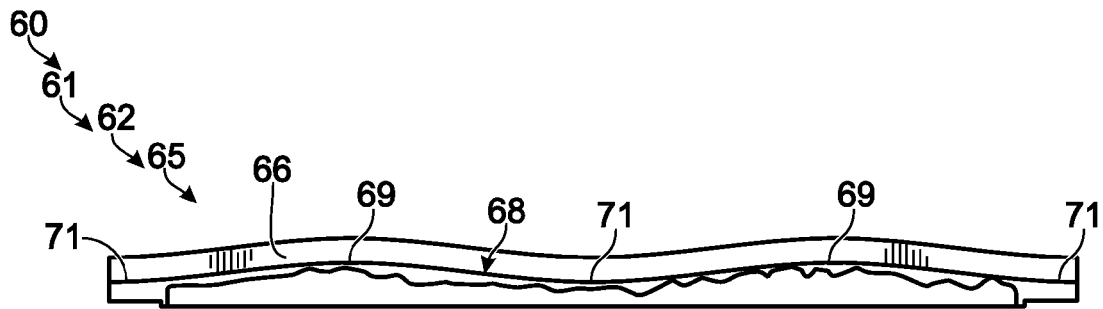
FIG. 7 is a side elevation view of a track section of the track of FIG. 6 in which the track section has an undulating track support surface.
Figure 8:
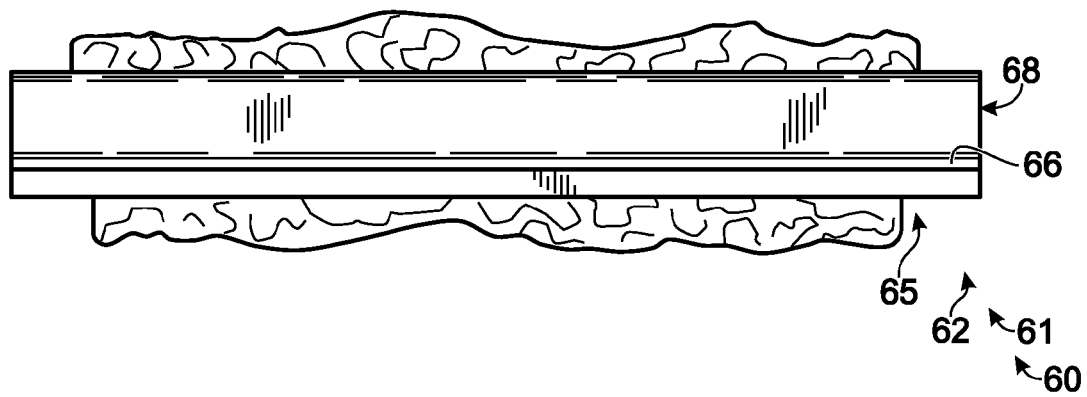
FIG. 8 is a top plan view of the track section of FIG. 7.
Figure 9:
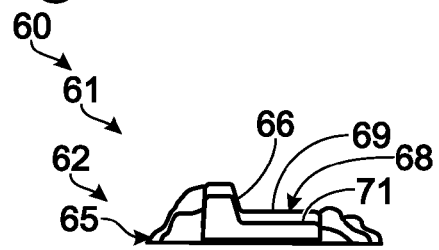
FIG. 9 is an end view of the track section of FIG. 7.

FIGS. 7-9 provide additional views of a track section 61 in the form of an undulating track section 65 that defines an undulating, or uneven, path of travel. FIGS. 7 and 9 perhaps best illustrate the sequential maximum elevations 69 and minimum elevations 71 of the track support surface 68, and FIGS. 8 and 9 perhaps best illustrate the constant, or continuous, horizontal component of the path of travel that is defined by track guide surface 66 despite the changes in elevation of the track support surface. As depicted in FIG. 7, the end regions of the track sections 65 define minimum elevations 71 that, as discussed, may correspond to the elevation of corresponding planar track sections (63, as shown in FIG. 6) to provide smooth transitions between adjacent track sections when the track sections are interconnected to form an assembled track 60.

Figure 10:
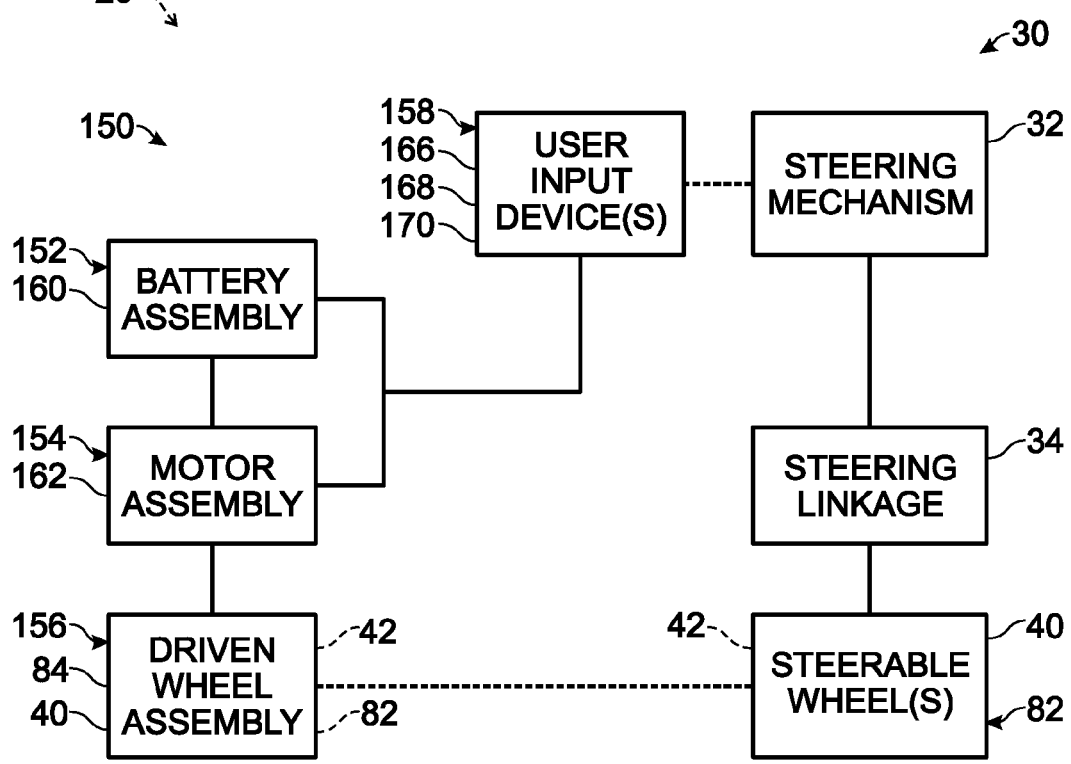
FIG. 10 is a schematic representation of examples of children's ride-on vehicles including a steering assembly and a drive assembly.

FIG. 10 is a schematic representation of optional steering assembly 30 and optional drive assembly 150 of children's ride-on vehicles 20. Steering assemblies 30 and drive assemblies 150 may be configured to cooperatively control the children's ride-on vehicle. Children's ride-on vehicles 20 may be (but are not required to be) powered, for example, battery powered. Children's ride-on vehicles 20 may be electrically powered with motors, or they may be child-powered (i.e., manually powered), such as with pedals or simply by the child pushing against the ground with his/her feet.

Steering assemblies 30 are configured to translate steering inputs of a child operator, such as a child sitting on a seat of the children's ride-on vehicle, into directional changes of the children's ride-on vehicle 20. Steering assemblies 30 may include a steering mechanism 32, such as handlebar(s), steering wheel(s), and/or steering lever(s). Steering mechanism 32 may be coupled, via a steering linkage 34, to at least one of the steerable wheels 82 in a manner to control the direction of the steerable wheel(s). Steering inputs by a child operator delivered to the steering mechanism are transferred, via the steering linkage, to the steerable wheel(s) to change the direction of travel of the steerable wheel(s) and thus the children's ride-on vehicle. The steering mechanism may be any suitable hand-operated mechanism to accept manual steering inputs from the child operator. The steering linkage may be any suitable linkage to transfer the steering inputs into directional changes of the steerable wheel(s). The steering linkage may translate rotary and/or linear inputs into rotary and/or linear outputs applied to the steerable wheel(s). The steering linkage may include rods, axles, shafts, collars, levers, gears, etc. Generally, all steerable wheels are coupled to, and controlled by, a steering assembly. One steering assembly may be configured to couple to, and to control, more than one, and potentially all, of the steerable wheels, including the guide wheels 42.

When the children's ride-on vehicle 20 is operated on the track 60, the steering assembly 30 optionally remains operational and may passively cooperate with the wheel guide surface(s) 52 and the track guide surface(s) 66 to guide the children's ride-on vehicle along the path of travel 70. Further, the child operator may use the steering assembly to guide children's ride-on vehicle 20 along the path of travel. If the child operator attempts to steer the children's ride-on vehicle contrary to the path of travel, the guide surfaces engage and cooperate to slow and/or guide the children's ride-on vehicle, as discussed further herein.

Examples of steering assemblies 30 for children's ride-on vehicles 20 that may include one or more guide wheels 42 and which optionally may be used with a track 60 to form a play system 10 are disclosed in U.S. Pat. Nos. 6,105,982, 6,554,087, and 7,216,878, the disclosures of which are hereby incorporated by reference.

Drive assemblies 150 may include a battery assembly 152, a motor assembly 154 electrically coupled to the battery assembly, a driven wheel assembly 156 operatively coupled to the motor assembly, and one or more user input devices 158. One type of drive assembly 150 that often is used in children's ride-on vehicles includes a battery-powered motor assembly 154 that is adapted to drive the rotation of one or more of the vehicle's wheels 40, i.e., a driven wheel 84. As used herein, the term "driven wheel" refers to a wheel that is rotated directly in response to a rotational input from the drive assembly. A driven wheel also may be a steerable wheel 82 and/or a guide wheel 42. The driven wheel may be configured to be driven by the drive assembly at any suitable speed(s) and/or direction(s).

Battery assembly 152 may be and/or include one or more batteries 160 that are adapted to provide power to the motor assembly 154. The one or more batteries in the battery assembly may have any suitable construction, and in some embodiments may be rechargeable batteries.

Motor assembly 154 may be and/or include one or more battery-powered motors 162 that are adapted to drive the rotation of at least one wheel of the driven wheel assembly 156, which may include one or more driven wheels 84, depending on the configuration of the children's ride-on vehicle 20.

User input device(s) 158 are adapted to convey inputs from a child seated on the children's ride-on vehicle 20 to the drive assembly 150. That is, the input device(s) are configured to convey a user's inputs, such as via a wiring harness, to control the actuation of motor assembly 154, such as by causing the actuation (or energizing) of the motor assembly, selecting between a range of electronic configurations, selecting the direction of rotation of the motor assembly's output, selecting the relative degree to which the motor assembly is actuated, etc. An example of a suitable user input device 158 includes (but is not limited to) a drive actuator 166, through which a user input directing battery assembly 152 to energize the motor assembly is received. Examples of suitable drive actuators include an on/off switch, a foot pedal, a throttle lever, and a rotational handgrip on a steering mechanism 32 such as a handlebar. Other illustrative, non-exclusive examples of user input devices include a speed switch 168, which enables a user to select the relative rate of rotation of the motor assembly's output, and a direction switch 170, which enables a user to select the relative direction or rotation of the motor assembly and thereby selectively configure the children's ride-on vehicle to drive in a forward or reverse direction. When present, user input devices 158 may be located in any suitable location on the children's ride-on vehicle, e.g., the vehicle body 22 and/or the steering mechanism 32, for actuation by a child seated on the seat of the children's ride-on vehicle, such as while having at least one hand on the steering mechanism.

Figure 11:
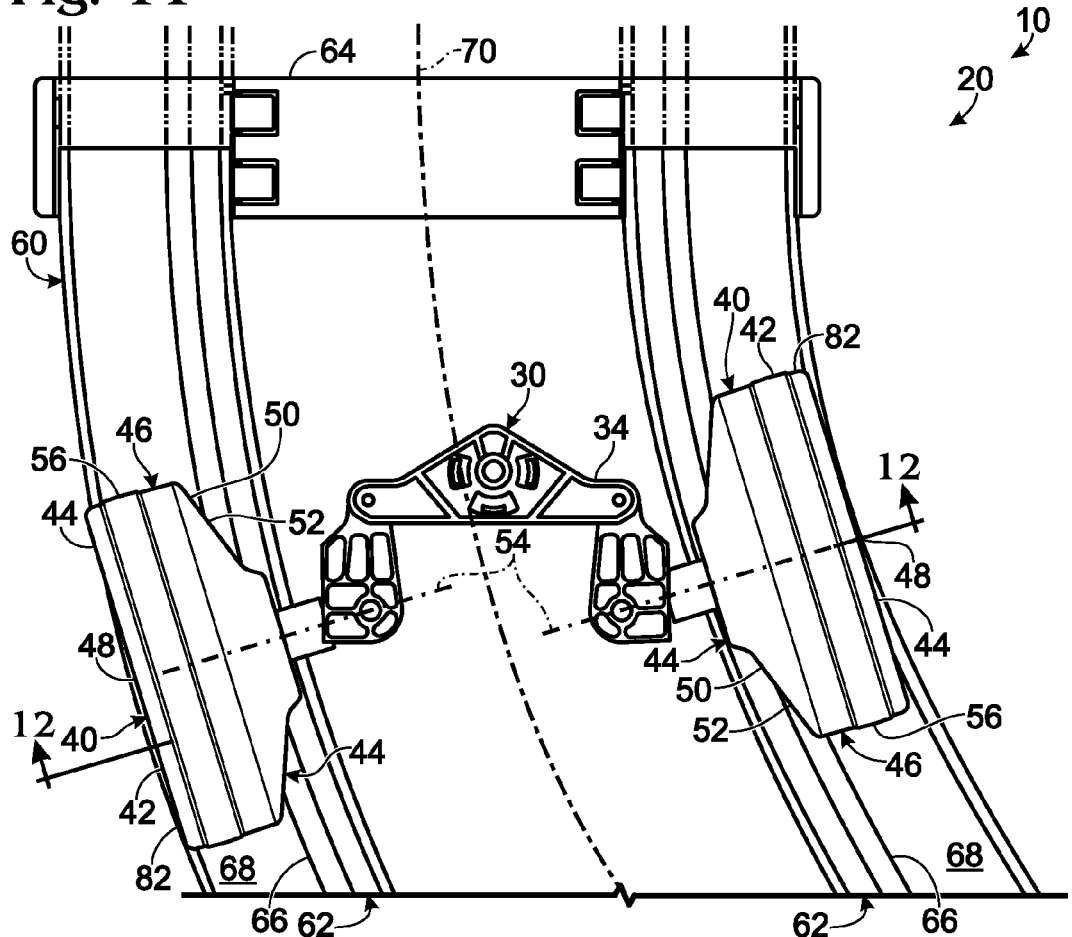
FIG. 11 is a fragmentary view of a steering assembly and a track of an example of a play system according to the present disclosure.
Figure 12:
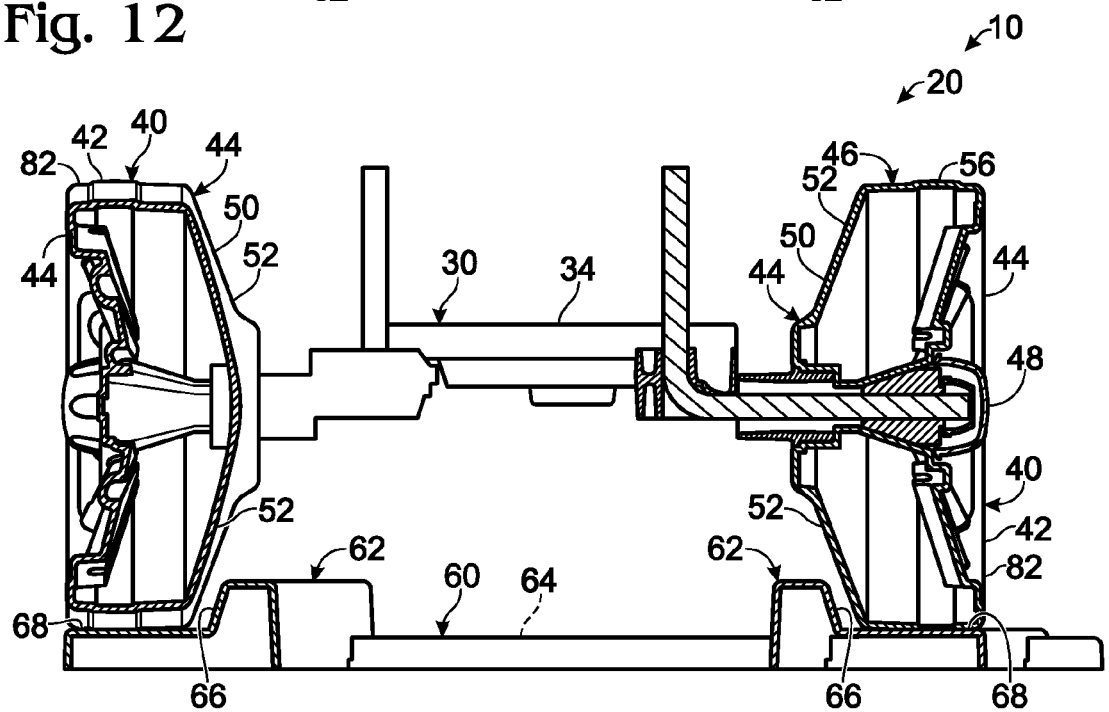
FIG. 12 is a cross-sectional view of the play system of FIG. 11 along the line 12-12.

FIGS. 11-12 depict an example of play system 10 in which guide wheels 42 are generally oriented along the path of travel 70 (which is indicated in FIG. 11) and with no significant contact, or engagement, between complementary pairs of guide surfaces (the proximate wheel guide surfaces 52 and track guide surfaces 66). The spacing of the guide wheels (and the wheel guide surfaces) relative to the spacing of the rails 62 (and the track guide surfaces) is configured to allow the children's ride-on vehicle 20 to progress along the path of travel with little or no contact between the wheel guide surface(s) and the track guide surface(s), and thus with little or no interference from the guide surfaces. As best seen in FIG. 12, when the guide wheels are directed substantially along the path of travel, the complementary wheel guide surface and track guide surface (and corresponding guide wheel and rail) are spaced apart. As discussed herein, if one of the wheel guide surfaces is steered (such as by a child sitting on the seat of the children's ride-on vehicle), or incidentally bumps into the complementary track guide surface, the play system 10 is generally configured to return the guide wheels and rails to a spaced-apart arrangement.

Figure 13:
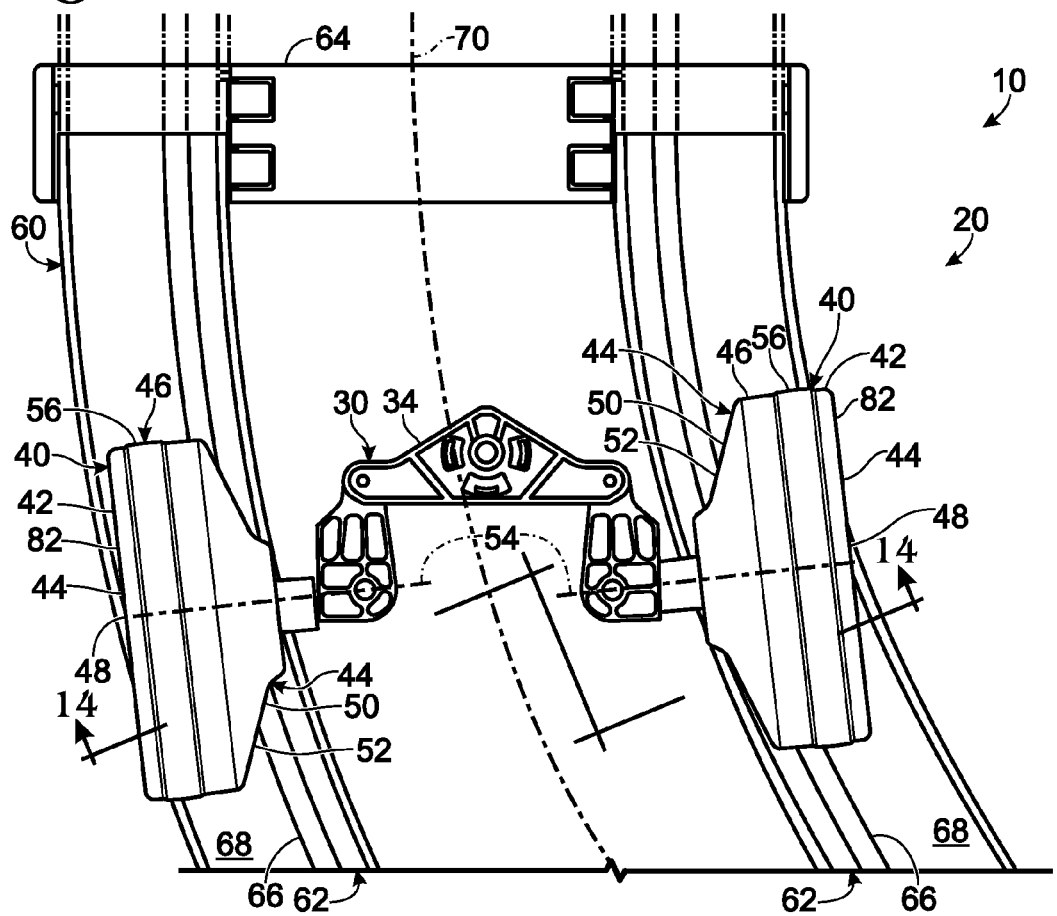
FIG. 13 is a fragmentary view of a steering assembly and a track of an example of a play system according to the present disclosure.
Figure 14:
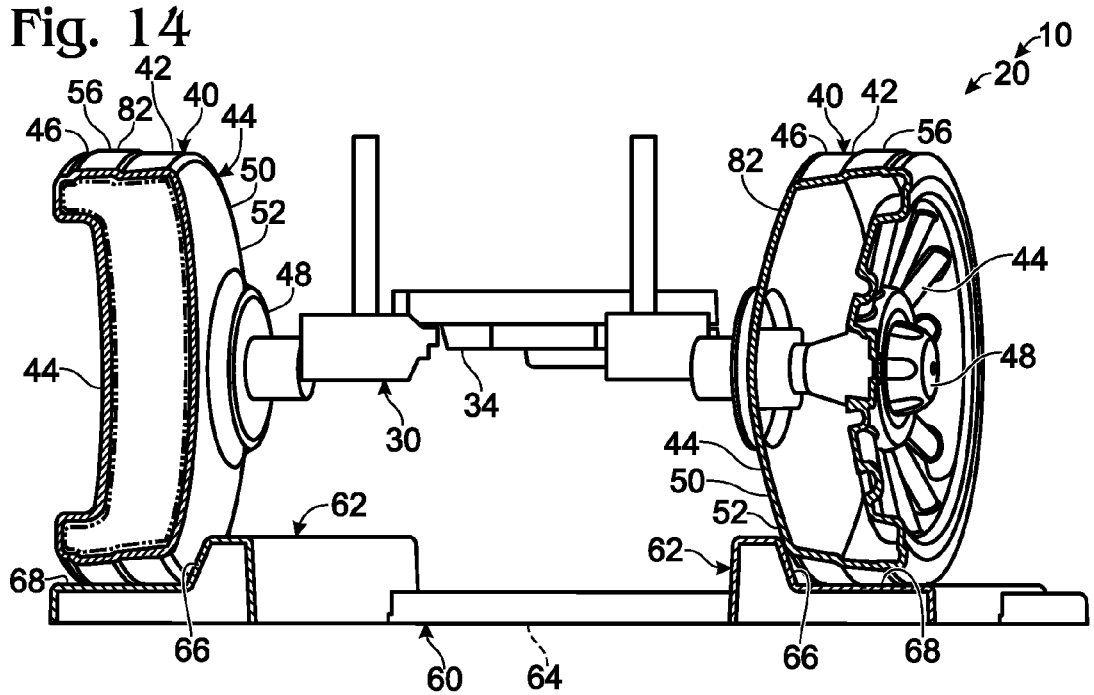
FIG. 14 is a cross-sectional view of the play system of FIG. 13 along the line 14-14.

FIGS. 13-14 depict an example of play systems 10 in which guide wheels 42 are oriented contrary to the path of travel 70 (which is indicated in FIG. 13) and with contact, and/or frictional engagement, between one or both complementary pairs of guide surfaces (the touching wheel guide surfaces 52 and track guide surfaces 66, as best seen in FIG. 14). In this configuration, whether by purposeful steering (such as by a child sitting on the seat of the children's ride-on vehicle) or incidental action (such as traversing a curved section of the track 60), the contact between the complementary guide surfaces redirects the guide wheel(s) back along the path of travel, and/or slows the children's ride-on vehicle 20 due to the additional friction of the contact. Though the children's ride-on vehicle may be powered, the contact between the complementary guide surfaces is configured to direct the children's ride-on vehicle along the path of travel rather than permitting the children's ride-on vehicle to follow the steered direction and potentially separate from the track.

As discussed, although FIGS. 11-14 depict the path of travel with respect to planar track regions, the corresponding interactions between the complementary guide surfaces (track guide surfaces 66 and wheel guide surfaces 52) also are present with undulating track sections.

Examples of play systems 10, children's ride-on vehicles 20, and/or tracks 60 according to the present disclosure are described in the following enumerated paragraphs:

A1. A children's ride-on vehicle, comprising:

a reduced-scale vehicle body sized for a child and including a seat sized for a child; and a plurality of wheels operatively coupled to the vehicle body;

wherein the plurality of wheels includes a guide wheel that is steerable, wherein the guide wheel includes a rim, and a guide sidewall that includes a wheel guide surface, wherein the guide wheel is configured to guide the children's ride-on vehicle along a path of travel defined by a track, wherein the wheel guide surface is configured to selectively, frictionally engage a track guide surface of the track that is complementary to the wheel guide surface, and wherein the guide wheel is configured to inhibit separation of the children's ride-on vehicle from the track while the children's ride-on vehicle is operated by a child sitting on the seat.

A2. The children's ride-on vehicle of paragraph A1, further comprising a steering assembly coupled to one or more steerable wheels, wherein the guide wheel is a steerable wheel, and wherein the steering assembly is configured to translate steering inputs from a child sitting on the seat of the children's ride-on vehicle into directional changes of the one or more steerable wheels.

A2.1. The children's ride-on vehicle of paragraph A2, wherein the steering assembly includes a steering mechanism configured to accept manual steering inputs from a child sitting on the seat.

A2.2. The children's ride-on vehicle of any of paragraphs A2-A2.1, wherein the steering assembly includes a steering linkage configured to transfer the steering inputs to the one or more steerable wheels.

A2.3. The children's ride-on vehicle of any of paragraphs A2-A2.2, wherein the steering assembly includes a steering linkage configured to translate the steering inputs into the directional changes.

A2.4. The children's ride-on vehicle of any of paragraphs A2-A2.3, wherein the children's ride-on vehicle is configured to allow the steerable wheel to pivot about an axis generally perpendicular to a rolling axis of the steerable wheel.

A2.5. The children's ride-on vehicle of any of paragraphs A2-A2.4, wherein the children's ride-on vehicle includes a plurality of guide wheels, and wherein each guide wheel is a steerable wheel.

A2.6. The children's ride-on vehicle of any of paragraphs A2-A2.5, wherein the children's ride-on vehicle includes a plurality of guide wheels, and wherein each guide wheel is coupled to the steering assembly.

A3. The children's ride-on vehicle of any of paragraphs A1-A2.6, wherein the children's ride-on vehicle is configured to allow the guide wheel to pivot about an axis generally perpendicular to a rolling axis of the guide wheel.

A4. The children's ride-on vehicle of any of paragraphs A1-A3, wherein the children's ride-on vehicle is configured to frictionally engage the track guide surface with the wheel guide surface if the children's ride-on vehicle is steered away from the path of travel, optionally by a child sitting on the seat.

A5. The children's ride-on vehicle of any of paragraphs A1-A4, wherein the children's ride-on vehicle is configured to slow progress of the children's ride-on vehicle along the path of travel by frictionally engaging the track guide surface with the wheel guide surface if the children's ride-on vehicle is steered away from the path of travel, optionally by a child sitting on the seat.

A6. The children's ride-on vehicle of any of paragraphs A1-A5, wherein the children's ride-on vehicle is configured to slow progress of the children's ride-on vehicle along the path of travel when the track guide surface and the wheel guide surface are frictionally engaged, optionally by a child sitting on the seat steering at least one guide wheel away from the path of travel.

A7. The children's ride-on vehicle of any of paragraphs A1-A6, wherein the children's ride-on vehicle is configured to progress along the path of travel without significant frictional engagement of the wheel guide surface with the track guide surface if the children's ride-on vehicle is steered along the path of travel.

A8. The children's ride-on vehicle of any of paragraphs A1-A7, wherein the guide wheel has an inboard side and an outboard side.

A8.1. The children's ride-on vehicle of paragraph A8, wherein the wheel guide surface is on the inboard side of the guide wheel.

A8.2. The children's ride-on vehicle of paragraph A8, wherein the wheel guide surface is on the outboard side of the guide wheel.

A9. The children's ride-on vehicle of any of paragraphs A1-A8.2, wherein the guide wheel includes one guide sidewall.

A10. The children's ride-on vehicle of any of paragraphs A1-A9, wherein the guide wheel includes one wheel guide surface.

A11. The children's ride-on vehicle of any of paragraphs A1-A10, wherein the wheel guide surface is inclined when the guide wheel is in an operational position.

A12. The children's ride-on vehicle of any of paragraphs A1-A11, wherein the wheel guide surface is oblique to a rolling surface of the rim.

A13. The children's ride-on vehicle of any of paragraphs A1-A12, wherein an interior angle between the wheel guide surface and a/the rolling surface of the rim is obtuse.

A14. The children's ride-on vehicle of any of paragraphs A1-A13, wherein the wheel guide surface is oblique to a rolling axis of the guide wheel.

A15. The children's ride-on vehicle of any of paragraphs A1-A14, wherein the wheel guide surface includes at least a portion that is convex.

A16. The children's ride-on vehicle of any of paragraphs A1-A15, wherein the wheel guide surface includes at least a portion that is substantially frustoconical.

A16.1. The children's ride-on vehicle of paragraph A16, wherein the guide wheel includes a hub, and wherein the guide sidewall is substantially frustoconical between the rim and the hub.

A16.2. The children's ride-on vehicle of any of paragraphs A16-A16.1, wherein a symmetry axis of the substantially frustoconical portion is substantially the same as a rolling axis of the guide wheel.

A17. The children's ride-on vehicle of any of paragraphs A1-A16.1, wherein the wheel guide surface is on an/the inboard side of the guide wheel, and wherein the wheel guide surface bulges or otherwise extends toward an inboard side of the children's ride-on vehicle.

A18. The children's ride-on vehicle of any of paragraphs A1-A16.1, wherein the wheel guide surface is on an/the outboard side of the guide wheel, and wherein the wheel guide surface bulges or otherwise extends toward an outboard side of the children's ride-on vehicle.

A19. The children's ride-on vehicle of any of paragraphs A1-A18, wherein a maximum width of the guide wheel at the wheel guide surface is wider than a width of the rim.

A20. The children's ride-on vehicle of any of paragraphs A1-A19, wherein the wheel guide surface is configured to selectively, frictionally engage the track guide surface with an extended contact.

A20.1. The children's ride-on vehicle of paragraph A20, wherein the extended contact is a line contact.

A20.2. The children's ride-on vehicle of any of paragraphs A20-A20.1, wherein the extended contact extends substantially radially along the guide wheel.

A21. The children's ride-on vehicle of any of paragraphs A1-A20.2, wherein the wheel guide surface is configured to direct the guide wheel substantially parallel to and/or away from the track guide surface if the guide wheel surface and the track guide surface are frictionally engaged, optionally by a child sitting on the seat steering the guide wheel away from the path of travel.

A22. The children's ride-on vehicle of any of paragraphs A1-A21, wherein the wheel guide surface is configured to redirect the children's ride-on vehicle along the path of travel if the children's ride-on vehicle is steered away from the path of travel and optionally into the track guide surface, optionally by a child sitting on the seat steering the guide wheel away from the path of travel.

A23. The children's ride-on vehicle of any of paragraphs A1-A22, wherein the rim includes a rolling surface.

A23.1. The children's ride-on vehicle of paragraph A23, wherein the rim and/or the rolling surface is configured to roll along the track.

A23.2. The children's ride-on vehicle of any of paragraphs A23-A23.1, wherein the rim and/or the rolling surface is configured to roll along a surface off the track.

A24. The children's ride-on vehicle of any of paragraphs A1-A23.2, wherein the rim includes a tread surface configured for off-track operation.

A25. The children's ride-on vehicle of any of paragraphs A1-A24, wherein the rim is substantially cylindrical.

A26. The children's ride-on vehicle of any of paragraphs A1-A25, wherein the guide wheel is configured to support at least part of, and optionally at least 25% of, further optionally at least 50% of, the weight of a child seated upon the children's ride-on vehicle during use of the children's ride-on vehicle.

A26.1. The children's ride-on vehicle of paragraph A26, wherein the rim and/or a/the rolling surface of the rim is configured to support at least part of, and optionally at least 25% of, further optionally at least 50% of, the weight of a child seated upon the children's ride-on vehicle during use of the children's ride-on vehicle.

A27. The children's ride-on vehicle of any of paragraphs A1-A26.1, wherein the children's ride-on vehicle comprises a pair of guide wheels that each includes a wheel guide surface.

A27.1. The children's ride-on vehicle of paragraph A27, wherein the wheel guide surface of each of the pair of guide wheels is on an/the inboard side of each of the pair of the guide wheels.

A27.2. The children's ride-on vehicle of paragraph A27, wherein the wheel guide surface of each of the pair of guide wheels is on an/the outboard side of each of the pair of the guide wheels.

A27.3. The children's ride-on vehicle of any of paragraphs A27-A27.2, wherein the wheel guide surfaces are opposed to each other.

A27.4. The children's ride-on vehicle of any of paragraphs A27-A27.3, wherein the wheel guide surfaces of the pair of guide wheels are spaced apart.

A27.5. The children's ride-on vehicle of any of paragraphs A27-A27.4, wherein one guide wheel of the pair of guide wheels is disposed on a left side of the children's ride-on vehicle, and the other guide wheel of the pair of guide wheels is disposed on a right side of the children's ride-on vehicle.

A27.6. The children's ride-on vehicle of any of paragraphs A27-A27.5, wherein a spacing between the wheel guide surface of each of the pair of guide wheels is configured to be wider than a spacing between a pair of track guide surfaces on the track.

A27.7. The children's ride-on vehicle of any of paragraphs A27-A27.5, wherein a spacing between the wheel guide surface of each of the pair of guide wheels is configured to be narrower than a spacing between a pair of track guide surfaces on the track.

A28. The children's ride-on vehicle of any of paragraphs A1-A27.7, wherein the children's ride-on vehicle is configured to engage a track with at least two, or a pair of, track guide surfaces.

A28.1. The children's ride-on vehicle of paragraph A28, wherein the children's ride-on vehicle is configured to engage a track with at least two, or a pair of, rails that each have a track guide surface.

A29. The children's ride-on vehicle of any of paragraphs A1-A28.1, wherein the guide wheel is a first guide wheel, and wherein the children's ride-on vehicle includes a second guide wheel with a wheel guide surface.

A29.1. The children's ride-on vehicle of paragraph A29, wherein the wheel guide surface of the first guide wheel and the wheel guide surface of the second guide wheel are opposed to each other.

A29.2. The children's ride-on vehicle of any of paragraphs A29-A29.1, wherein the wheel guide surface of the first guide wheel is on an/the inboard side of the first guide wheel and the wheel guide surface of the second guide wheel is on an/the inboard side of the second guide wheel.

A29.3. The children's ride-on vehicle of any of paragraphs A29-A29.1, wherein the wheel guide surface of the first guide wheel is on an/the outboard side of the first guide wheel and the wheel guide surface of the second guide wheel is on an/the outboard side of the second guide wheel.

A29.4. The children's ride-on vehicle of any of paragraphs A29-A29.3, wherein the track guide surface is a first track guide surface, wherein the track includes a second track guide surface, and wherein the wheel guide surface of the second guide wheel is complementary to the second track guide surface.

A30. The children's ride-on vehicle of any of paragraphs A1-A29.4, wherein the children's ride-on vehicle is battery powered.

A31. The children's ride-on vehicle of any of paragraphs A1-A30, further comprising a motor operatively coupled to, and configured to drive, at least one of the plurality of wheels.

A31.1. The children's ride-on vehicle of paragraph A31, wherein the motor is battery powered.

A31.2. The children's ride-on vehicle of any of paragraphs A31-A31.1, further comprising a battery assembly configured to provide power to the motor.

A32. The use of the children's ride-on vehicle of any of paragraphs A1-A31.2 with the track of any of paragraphs B1-B16.1.

B1. A track for a children's ride-on vehicle, optionally, the children's ride-on vehicle of any of paragraphs A1-A31.2, comprising:

a rail including a track guide surface configured to guide a children's ride-on vehicle along a path of travel defined by the track and to selectively, frictionally engage a wheel guide surface of a guide wheel of the children's ride-on vehicle, wherein the wheel guide surface is complementary to the track guide surface, and wherein the rail is configured to inhibit separation of the children's ride-on vehicle from the track while the children's ride-on vehicle is operated by a child.

B2. The track of paragraph B1, further comprising a track support surface configured to support the children's ride-on vehicle, and optionally the children's ride-on vehicle with a child seated upon the children's ride-on vehicle, as the children's ride-on vehicle travels along the path of travel.

B2.1. The track of paragraph B2, wherein an exterior angle between the track guide surface and the track support surface is obtuse.

B2.2. The track of any of paragraphs B2-B2.1, wherein an/the exterior angle between the track guide surface and the track support surface is substantially the same as an interior angle between the wheel guide surface and a rolling surface of a rim.

B2.3. The track of any of paragraphs B2-B2.2, wherein the track support surface is below the track guide surface when the track is in an operational position.

B2.4. The track of any of paragraphs B2-B2.3, wherein the rail is configured to protrude above the track support surface when the track is in an operational position.

B2.5. The track of any of paragraphs B2-B2.4, wherein the track support surface defines a planar path of travel.

B2.6. The track of any of paragraphs B2-B2.4, wherein the track support surface defines an undulating path of travel that includes sequential maximum and minimum elevations of the track support surface.

B2.7. The track of any of paragraphs B2.5-B2.6, wherein the track includes at least one track region that defines a planar path of travel and at least one track region that defines an undulating path of travel.

B2.8. The track of paragraph B2.7, wherein the track region that defines a planar path of travel has an elevation that is equal to the minimum elevation of the track support surface that defines an undulating path of travel.

B2.9. The track of any of paragraphs B2.7-B2.8, wherein the exterior angle between the track guide surface and the track support surface is the same for both the track region that defines the planar path of travel and the track region that defines the undulating path of travel.

B3. The track of any of paragraphs B1-B2.9, wherein the rail has an inboard side and an outboard side.

B3.1. The track of paragraph B3, wherein the track guide surface is on the outboard side of the rail.

B3.2. The track of paragraph B3, wherein the track guide surface is on the inboard side of the rail.

B3.3. The track of any of paragraphs B3-B3.2, wherein the rail has a top and a base, and wherein the track guide surface is inclined from the base of the rail toward the outboard side at the top of the rail.

B3.4. The track of any of paragraphs B3-B3.2, wherein the rail has a top and a base, and wherein the track guide surface is inclined from the base of the rail toward the inboard side at the top of the rail.

B4. The track of any of paragraphs B1-B3.2, wherein the track guide surface is inclined when the track is in an operational position.

B5. The track of any of paragraphs B1-B4, wherein the track guide surface includes at least a portion that is at least one of convex, concave, and flat.

B6. The track of any of paragraphs B1-B5, wherein a profile of the rail includes a straight segment corresponding to the track guide surface.

B6.1. The track of paragraph B6, wherein the straight segment is inclined when the track is in an operational position.

B6.2. The track of any of paragraphs B6-B6.1, wherein the rail includes an inboard side and an outboard side, and wherein a top of the straight segment is closer to the inboard side than a bottom of the straight segment.

B6.3. The track of any of paragraphs B6-B6.1, wherein the rail includes an inboard side and an outboard side, and wherein a bottom of the straight segment is closer to the inboard side than a top of the straight segment.

B7. The track of any of paragraphs B1-B6.3, wherein the rail includes a top portion that is the narrowest portion of the rail.

B8. The track of any of paragraphs B1-B7, wherein the track guide surface is configured to selectively, frictionally engage the wheel guide surface with an extended contact.

B8.1. The track of paragraph B8, wherein the extended contact is a line contact.

B8.2. The track of any of paragraphs B8-B8.1, wherein the extended contact extends substantially radially along the guide wheel.

B9. The track of any of paragraphs B1-B8.2, wherein the track guide surface is configured to redirect the children's ride-on vehicle along the path of travel if the children's ride-on vehicle is steered away from the path of travel and optionally into the track guide surface, and optionally by a child sitting on the seat.

B10. The track of any of paragraphs B1-B9, wherein the track comprises a pair of rails each with a track guide surface.

B10.1. The track of paragraph B10, wherein the track guide surface of each of the pair of rails is on an/the inboard side of each of the pair of rails.

B10.2. The track of paragraph B10, wherein the track guide surface of each of the pair of rails is on an/the outboard side of each of the pair of rails.

B10.3. The track of any of paragraphs B10-B10.2, wherein the track guide surface of each of the pair of rails face toward opposite sides of the track.

B10.4. The track of any of paragraphs B10-B10.3, wherein the rails of the pair of rails are spaced apart, optionally with a substantially constant spacing and/or gauge.

B10.5. The track of any of paragraphs B10-B10.4, wherein a spacing between the track guide surface of each of the pair of rails is configured to be narrower than a spacing between a pair of wheel guide surfaces on the children's ride-on vehicle.

B10.6. The track of any of paragraphs B10-B10.4, wherein a spacing between the track guide surface of each of the pair of rails is configured to be wider than a spacing between a pair of wheel guide surfaces on the children's ride-on vehicle.

B10.7. The track of any of paragraphs B10-B10.6, wherein the track includes a straight portion and a curved portion, wherein a spacing between, and/or a gauge of, the pair of rails in the straight portion is narrower than a spacing between, and/or a gauge of, the pair of rails in the curved portion.

B10.8. The track of any of paragraphs B10-B10.6, wherein the track includes a straight portion and a curved portion, wherein a spacing between, and/or a gauge of, the pair of rails in the straight portion is wider than a spacing between, and/or a gauge of, the pair of rails in the curved portion.

B11. The track of any of paragraphs B1-B10.8, wherein the rail is a first rail and the track includes a second rail with a track guide surface, optionally wherein the first rail and the second rail form a pair of rails.

B12. The track of any of paragraphs B1-B11, wherein the track guide surface is a first track guide surface and the rail includes a second track guide surface.

B12.1. The track of paragraph B12, wherein the second track guide surface is opposed to the first track guide surface.

B12.2. The track of any of paragraphs B12-B12.1, wherein the first track guide surface faces toward or away from an/the outboard side of the children's ride-on vehicle and/or the track.

B12.3. The track of any of paragraphs B12-B12.2, wherein the second track guide surface faces toward or away from an/the inboard side of the children's ride-on vehicle and/or the track.

B12.4. The track of any of paragraphs B12-B12.3, wherein the first track guide surface and the second track guide surface face toward opposite sides of the track.

B13. The track of any of paragraphs B1-B12.4, wherein the track is configured to engage a children's ride-on vehicle with a pair of wheel guide surfaces.

B13.1. The track of paragraph B13, wherein the track is configured to engage a children's ride-on vehicle with a pair of guide wheels that each have a wheel guide surface.

B14. The track of any of paragraphs B1-B13.1, wherein the track includes a straight portion configured to guide a children's ride-on vehicle straight.

B15. The track of any of paragraphs B1-B14, wherein the track includes a curved portion configured to guide a children's ride-on vehicle around a curve.

B16. The track of any of paragraphs B1-B15, wherein the track is composed of a plurality of track sections.

B16.1. The track of paragraph B16, wherein the plurality of track sections includes at least one track section that is curved and at least one track section that is straight.

B17. A kit to assemble the track of any of paragraphs B1-B16.1, comprising:
a plurality of track sections configured to form the track.

B17.1. The kit of paragraph B17, wherein all of the track sections define a planar path of travel.

B17.2. The kit of paragraph B17, wherein all of the track sections define an undulating path of travel.

B17.3. The kit of paragraph B17, wherein at least one of the track sections defines a planar path of travel and at least one of the track sections defines an undulating path of travel.

B17.4. The kit of any of paragraphs B17-B17.3 further comprising the children's ride-on vehicle of any of paragraphs A1-A31.2.

B17.5. The kit of any of paragraphs B17-B17.4, wherein the plurality of track sections are configured to interconnect, optionally to form a substantially continuous track and/or one or more substantially continuous rails.

B18. The use of the track of any of paragraphs B1-B16.1 or the kit of any of paragraphs B17-B17.5 to define a continuous path of travel for a children's ride-on vehicle, and optionally the children's ride-on vehicle of any of paragraphs A1-A31.2.

C1. A play system, comprising:

the children's ride-on vehicle of any of paragraphs A1-A31.2; and the track of any of paragraphs B1-B16.1;

wherein the wheel guide surface of the children's ride-on vehicle is complementary to the track guide surface.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It also is within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

In the event that any patents or patent applications are incorporated by reference herein and (1) define a term in a manner and/or (2) are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

INDUSTRIAL APPLICABILITY

The systems and methods disclosed herein are applicable to the toy vehicle and children's products industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

The invention claimed is:

1. A play system, comprising:
   a track including a rail with a track guide surface and a track support surface adjacent the track guide surface; and
   a children's ride-on vehicle, including:
      a reduced-scale vehicle body sized for a child and including a seat sized for a child;
      a plurality of wheels operatively coupled to the vehicle body, wherein the plurality of wheels includes one or more steerable wheels, wherein each steerable wheel includes a rim with a rolling surface and is configured to rotate about a rolling axis, wherein at least one of the one or more steerable wheels is a guide wheel that includes a wheel guide surface; and
   a steering assembly coupled to the one or more steerable wheels, wherein the steering assembly is configured to translate steering inputs from a child sitting on the seat of the children's ride-on vehicle into directional changes of the rolling axis of each of the one or more steerable wheels, relative to the vehicle body to which the one or more steerable wheels is coupled, by pivoting the one or more steerable wheels relative to the vehicle body;
   wherein the track support surface is configured to support the children's ride-on vehicle with a child seated upon the children's ride-on vehicle;
   wherein the track support surface defines an undulating path of travel that includes sequential maximum and minimum elevations of the track support surface;
   wherein the track guide surface and the wheel guide surface are complementary to each other, configured to guide the children's ride-on vehicle along a path of travel defined by the track, and configured to inhibit separation of the children's ride-on vehicle from the track while the children's ride-on vehicle is operated by a child sitting on the seat; and
   wherein the children's ride-on vehicle is configured to frictionally engage the track guide surface with the wheel guide surface if the children's ride-on vehicle is steered away from the path of travel, and wherein the children's ride-on vehicle is configured to progress along the path of travel without significant frictional engagement of the wheel guide surface with the track guide surface if the children's ride-on vehicle is steered along the path of travel.

2. The play system of claim 1, wherein the track support surface includes a track region that defines the undulating path of travel, and further wherein the track support surface further includes a track region that defines a planar path of travel.

3. The play system of claim 2, wherein the track region that defines a planar path of travel has an elevation that is equal to the minimum elevation of the track support surface that defines the undulating path of travel.

4. The play system of claim 2, wherein the exterior angle between the track guide surface and the track support surface is the same for both the track region that defines the planar path of travel and the track region that defines the undulating path of travel.

5. The play system of claim 1, wherein the steering assembly includes a steering mechanism in the form of a handlebar, steering wheel, or at least one steering lever, and further wherein the steering mechanism is coupled to the one or more steerable wheels by a steering linkage to transfer steering inputs from the steering mechanism to the one or more steerable wheels to cause the one or more steerable wheels to pivot relative to the vehicle body.

6. The play system of claim 1, wherein the children's ride-on vehicle is configured to slow progress of the children's ride-on vehicle along the path of travel when the track guide surface and the wheel guide surface are frictionally engaged.

7. The play system of claim 1, wherein the wheel guide surface and the track guide surface are configured to redirect the children's ride-on vehicle along the path of travel if the children's ride-on vehicle is steered away from the path of travel and into the track guide surface.

8. The play system of claim 1, wherein an interior angle between the wheel guide surface and the rolling surface is obtuse.

9. The play system of claim 1, wherein the wheel guide surface includes at least a portion that is substantially frusto-conical.

10. The play system of claim 1, wherein the wheel guide surface is on an inboard side of the guide wheel and wherein the wheel guide surface bulges toward an inboard side of the children's ride-on vehicle.

11. The play system of claim 1, wherein the wheel guide surface and the track guide surface are configured to selectively, frictionally engage each other with an extended contact.

12. The play system of claim 1, wherein an exterior angle between the track guide surface and the track support surface is obtuse.

13. The play system of claim 1, wherein an exterior angle between the track guide surface and the track support surface is substantially the same as an interior angle between the wheel guide surface and the rolling surface.

14. The play system of claim 1, wherein the rail has an inboard side, an outboard side, a top, and a base, and wherein the track guide surface is on the outboard side of the rail and inclined from the base of the rail toward the inboard side at the top of the rail.

15. The play system of claim 1, wherein the rail includes a top portion that is the narrowest portion of the rail.

16. The play system of claim 1, wherein the children's ride-on vehicle includes a battery-powered motor operatively coupled to, and configured to drive, at least one of the plurality of wheels.

17. The play system of claim 1, wherein the guide wheel is a first guide wheel and the wheel guide surface of the first guide wheel is on an inboard side of the first guide wheel,
   wherein the children's ride-on vehicle includes a second guide wheel with a wheel guide surface on an inboard side of the second guide wheel,
   wherein the track guide surface is a first track guide surface and the rail includes a second track guide surface, and wherein the first track guide surface and the second track guide surface face toward opposite outboard sides of the track, and
   wherein the wheel guide surface of the second guide wheel is complementary to the second track guide surface.

18. The play system of claim 1, wherein the guide wheel is a first guide wheel and the wheel guide surface of the first guide wheel is on an inboard side of the first guide wheel, wherein the children's ride-on vehicle includes a second guide wheel with a wheel guide surface and a rim with a rolling surface, wherein the wheel guide surface of the second guide wheel is on an inboard side of the second guide wheel, wherein the rail is a first rail and the track includes a second rail with a track guide surface, and wherein the track guide surface of the first rail and the track guide surface of the second rail face toward opposite outboard sides of the track, and wherein the wheel guide surface of the second guide wheel is complementary to the track guide surface of the second rail.

19. The play system of claim 18, wherein the track includes a first track support surface adjacent to the track guide surface of the first rail and a second track support surface adjacent to the track guide surface of the second rail, wherein the first track support surface is configured to support the first guide wheel and the second track support surface is configured to support the second guide wheel.

20. The play system of claim 19, wherein an exterior angle between the track guide surface of the first rail and the first track support surface is substantially the same as an exterior angle between the track guide surface of the second rail and the second track support surface, and wherein both exterior angles are obtuse.

21. The play system of claim 18, wherein an interior angle between the wheel guide surface and the rolling surface of the first guide wheel is substantially the same as an interior angle between the wheel guide surface and the rolling surface of the second guide wheel, and wherein both interior angles are obtuse.

22. The play system of claim 18, wherein the first rail and the second rail are spaced apart with a substantially constant gauge.

23. The play system of claim 18, wherein the track includes a straight portion and a curved portion, wherein a gauge defined by the first rail and the second rail in the straight portion is narrower than a gauge defined by the first rail and the second rail in the curved portion.

24. A kit to assemble the play system of claim 1, comprising:

a plurality of track sections configured to interconnect to form the track with a substantially continuous rail; and the children's ride-on vehicle.

25. A play system, comprising:

a track including a rail with a track guide surface and a track support surface adjacent the track guide surface; and a children's ride-on vehicle, including:

a reduced-scale vehicle body sized for a child and including a seat sized for a child;

a plurality of wheels operatively coupled to the vehicle body, wherein the plurality of wheels includes a guide wheel that includes a wheel guide surface and a rim with a rolling surface;

a battery-powered motor operatively coupled to, and configured to drive, at least one of the plurality of wheels; and a steering assembly coupled to one or more steerable wheels, wherein the guide wheel is a steerable wheel, and wherein the steering assembly is configured to translate steering inputs from a child sitting on the seat of the children's ride-on vehicle into directional changes of the one or more steerable wheels;

wherein the track support surface is configured to support the children's ride-on vehicle with a child seated upon the children's ride-on vehicle;

wherein the track support surface defines an undulating path of travel that includes sequential maximum and minimum elevations of the track support surface;

wherein the track guide surface and the wheel guide surface are complementary to each other, configured to guide the children's ride-on vehicle along a path of travel defined by the track, and configured to inhibit separation of the children's ride-on vehicle from the track while the children's ride-on vehicle is operated by a child sitting on the seat;

wherein an exterior angle between the track guide surface and the track support surface is substantially the same as an interior angle between the wheel guide surface and the rolling surface;

wherein the rail has an inboard side, an outboard side, a top, and a base, and wherein the track guide surface is on the outboard side of the rail and inclined from the base of the rail toward the inboard side at the top of the rail; and wherein the children's ride-on vehicle is configured to frictionally engage the track guide surface with the wheel guide surface if the children's ride-on vehicle is steered away from the path of travel, and wherein the children's ride-on vehicle is configured to progress along the path of travel without significant frictional engagement of the wheel guide surface with the track guide surface if the children's ride-on vehicle is steered along the path of travel.

\* \* \* \* \*